(12) United States Patent
Lin

(10) Patent No.: US 9,086,503 B2
(45) Date of Patent: Jul. 21, 2015

(54) PROPAGATING FRACTURE PLANE UPDATES

(71) Applicant: HALLIBURTON ENERGY SERVICES, INC., Houston, TX (US)

(72) Inventor: Avi Lin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 59 days.

(21) Appl. No.: 13/896,425

(22) Filed: May 17, 2013

(65) Prior Publication Data

US 2014/0098637 A1    Apr. 10, 2014

Related U.S. Application Data

(60) Provisional application No. 61/710,582, filed on Oct. 5, 2012.

(51) Int. Cl.
| | |
|---|---|
| *G01V 1/28* | (2006.01) |
| *G01V 1/40* | (2006.01) |
| *G01V 1/34* | (2006.01) |
| *G01V 1/30* | (2006.01) |

(52) U.S. Cl.
CPC ............... *G01V 1/288* (2013.01); *G01V 1/301* (2013.01); *G01V 1/34* (2013.01); *G01V 1/345* (2013.01); *G01V 1/40* (2013.01); *G01V 2210/1234* (2013.01); *G01V 2210/646* (2013.01)

(58) Field of Classification Search
CPC .......... G01V 1/288; G01V 1/301; G01V 1/34; G01V 1/345; G01V 1/40; G01V 2210/1234; G01V 2210/646

USPC ................................................ 367/38, 73
See application file for complete search history.

(56) References Cited

U.S. PATENT DOCUMENTS

| | | | |
|---|---|---|---|
| 5,497,722 A | 3/1996 | English, Sr. | |
| 5,528,494 A * | 6/1996 | Moses | 702/4 |
| 7,069,149 B2 * | 6/2006 | Goff et al. | 702/16 |

(Continued)

FOREIGN PATENT DOCUMENTS

| | | |
|---|---|---|
| GB | 2439571 | 1/2008 |
| WO | WO 2008/107859 | 9/2008 |

(Continued)

OTHER PUBLICATIONS

Rowe et al., "Using Automated, High-precision Repicking to Improve Delineation of Microseismic Structures at the Soultz Geothermal Reservoir," Pure and Applied Geophysics 159, pp. 563-596, 2002.*

(Continued)

*Primary Examiner* — Daniel L Murphy
(74) *Attorney, Agent, or Firm* — Holly Soehnge; Fish & Richardson P.C.

(57) ABSTRACT

Systems, methods, and software can be used to update fracture planes based on microseismic data from a fracture treatment. In some aspects, a first fracture plane is updated based on a microseismic event in a microseismic data set associated with a fracture treatment. The first fracture plane is one of multiple previously-generated fracture planes. A second, different fracture plane of the previously-generated fracture planes is updated to account for information generated by updating the first fracture plane based on the microseismic event.

18 Claims, 6 Drawing Sheets

(56) References Cited

U.S. PATENT DOCUMENTS

| | | |
|---|---|---|
| 7,103,219 B2 | 9/2006 | Cahill |
| 7,663,970 B2 * | 2/2010 | Duncan et al. ............... 367/38 |
| 7,783,127 B1 | 8/2010 | Wilensky |
| 8,386,226 B2 | 2/2013 | Craig |
| 8,392,165 B2 | 3/2013 | Craig et al. |
| 2007/0272407 A1 | 11/2007 | Lehman et al. |
| 2008/0004847 A1 | 1/2008 | Bradford |
| 2010/0307755 A1 | 12/2010 | Xu et al. |
| 2010/0312529 A1 | 12/2010 | Souche et al. |
| 2011/0029291 A1 | 2/2011 | Weng et al. |
| 2011/0029293 A1 | 2/2011 | Petty et al. |
| 2011/0120702 A1 | 5/2011 | Craig |
| 2011/0120705 A1 | 5/2011 | Walters et al. |
| 2011/0120706 A1 | 5/2011 | Craig |
| 2011/0120718 A1 | 5/2011 | Craig |
| 2014/0188447 A1 * | 7/2014 | Venkataraman et al. ......... 703/2 |

FOREIGN PATENT DOCUMENTS

| | | |
|---|---|---|
| WO | WO 2011/077223 | 6/2011 |
| WO | WO 2011/077227 | 6/2011 |
| WO | WO 2012/078128 | 6/2012 |
| WO | WO 2012/141720 | 10/2012 |

OTHER PUBLICATIONS

Authorized Officer Bream, Philip, "PCT International Search Report and Written Opinion of the International Searching Authority", PCT Application No. PCT/US2013/055612, Dec. 16, 2013, 8 pages.

Lin, "Managing Microseismic Data for Fracture Matching", U.S. Appl. No. 13/896,406, May 17, 2013, 46 pages.

Ma et al., "Analyzing Microseismic Data From a Fracture Treatment", U.S. Appl. No. 13/896,389, May 17, 2013, 50 pages.

Williams et al., "Quantitative Interpretation of Major Planes from Microseismic Events Locations with Application in Production Prediction", SEG 2010-2085, 2010 SEG Annual Meeting, Copyright 2010, 5 pages.

Mayerhofer et al., "Integrating Fracture Diagnostic Engineering Data in the Marcellus Shale," SPE 145463, 2011, SPE Annual Technical Conference and Exhibition, Oct. 30-Nov. 2, 2011, Denver, Colorado, 15 pages.

* cited by examiner

PROPAGATING FRACTURE PLANE UPDATES

CROSS-REFERENCE TO RELATED APPLICATIONS

This application claims priority to U.S. Provisional Application Ser. No. 61/710,582, entitled "Identifying Dominant Fracture Orientations," filed on Oct. 5, 2012.

BACKGROUND

This specification relates to managing microseismic data, for example, in a fracture matching process. Microseismic data are often acquired in association with hydraulic fracturing treatments applied to a subterranean formation. The hydraulic fracturing treatments are typically applied to induce artificial fractures in the subterranean formation, and to thereby enhance hydrocarbon productivity of the subterranean formation. The pressures generated by the fracture treatment can induce low-amplitude or low-energy seismic events in the subterranean formation, and the events can be detected by sensors and collected for analysis.

SUMMARY

In one general aspect, previously-generated fracture planes are updated based on microseismic data associated with a fracture treatment.

In some aspects, a first fracture plane is updated based on a microseismic event associated with a fracture treatment. The first fracture plane is one of multiple fracture planes that were previously generated based on prior microseismic data. The previously-generated fracture planes also include a second, different fracture plane, which is updated in response to updating the first fracture plane.

Implementations may include one or more of the following features. Updating the second fracture plane includes merging the first fracture plane and the second fracture plane. The first fracture plane and the second fracture plane are merged in response to determining that the first fracture plane and the second fracture plane are separated by a distance that is less than a threshold distance. The first fracture plane and the second fracture plane are merged in response to determining that the first fracture plane and the second fracture plane intersect at an angle that is less than a threshold angle.

Additionally or alternatively, these and other implementations may include one or more of the following features. The microseismic event includes a first microseismic event. Updating the first fracture plane causes a second, different microseismic event to become disassociated from the first fracture plane. Updating the second fracture plane includes associating the second microseismic event with the second fracture plane; and updating the second fracture plane based on the second microseismic event.

Additionally or alternatively, these and other implementations may include one or more of the following features. The microseismic event includes a first microseismic event. Updating the first fracture plane causes a second, different microseismic event to become associated with the first fracture plane and disassociated from the second fracture plane. Updating the second fracture plane includes updating the second fracture plane based on the second microseismic event becoming disassociated from the second fracture plane.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
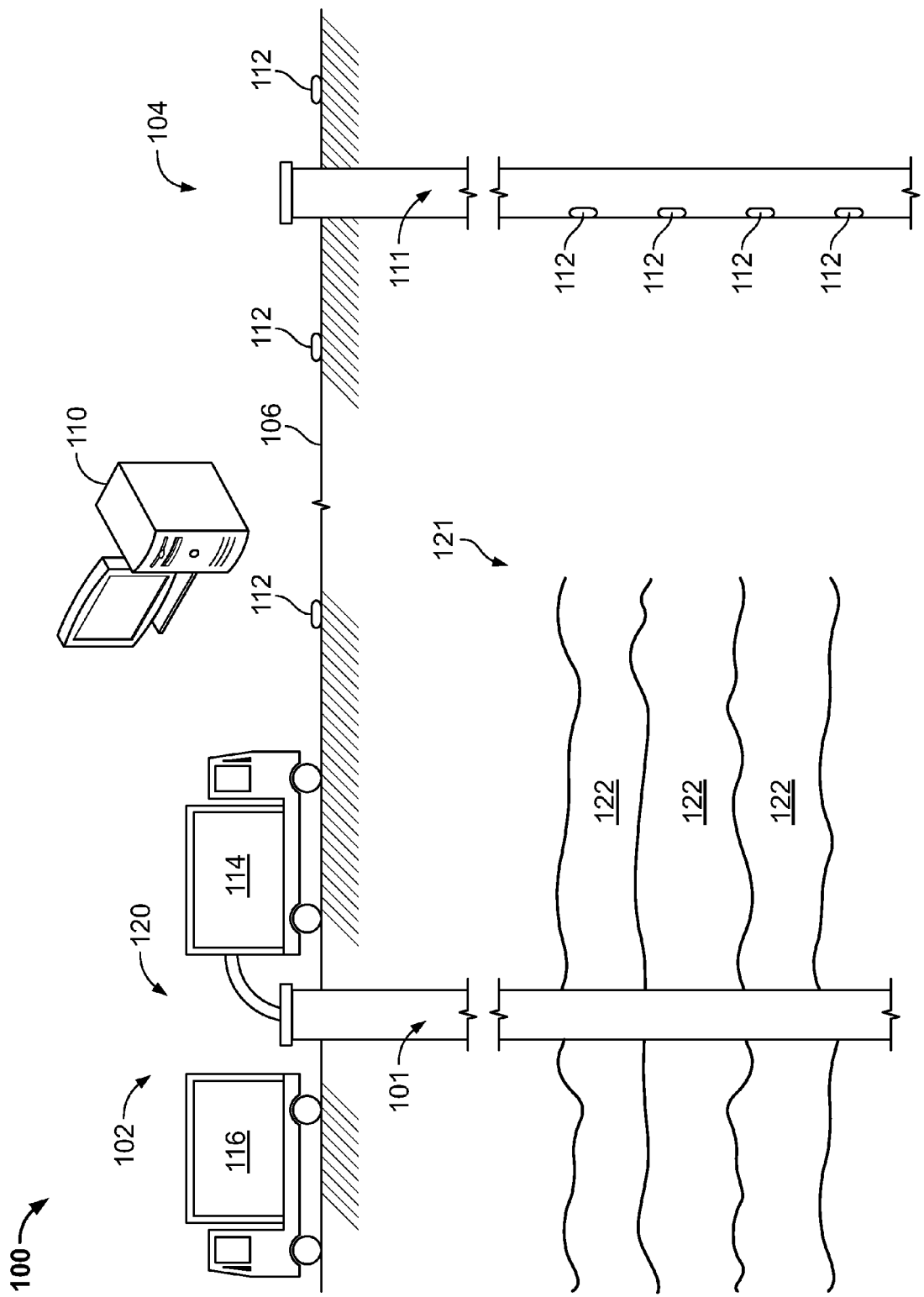
FIG. 1A is a diagram of an example well system.

In some aspects of what is described here, fracture parameters, dominant fracture orientations, or other data are identified from microseismic data. In some instances, these or other types of data are dynamically identified, for example, in a real-time fashion during a fracture treatment. For many applications and analysis techniques, an identification of fracture planes from real-time microseismic events is needed, and individual fracture planes can be displayed to show time evolution and geometric elimination, including location, propagation, growth, reduction, or elimination of the fracture planes. Such capabilities can be incorporated into control systems, software, hardware, or other types of tools available to oil and gas field engineers when they analyze potential oil and gas fields, while stimulating hydraulic fractures and analyzing the resultant signals. Such tools can provide a reliable and direct interface for presenting and visualizing the dynamics of hydraulic fractures, which may assist in analyzing the fracture complexity, fracture network structure, and reservoir geometry. Such tools can assist in evaluating the effectiveness of hydraulic fracturing treatment, for example, by improving, enhancing, or optimizing the fracture density and trace lengths and heights. Such improvements in the fracture treatment applied to the reservoir may enhance production of hydrocarbons or other resources from the reservoir.

Hydraulic fracture treatments can be applied in any suitable subterranean zone. Hydraulic fracture treatments are often applied in tight formations with low-permeability reservoirs, which may include, for example, low-permeability conventional oil and gas reservoirs, continuous basin-centered resource plays and shale gas reservoirs, or other types of formations. Hydraulic fracturing can induce artificial fractures in the subsurface, which can enhance the hydrocarbon productivity of a reservoir.

During the application of a hydraulic fracture treatment, the injection of high-pressure fluids can alter stresses, accumulate shear stresses, and cause other effects within the geological subsurface structures. In some instances, microseismic events are associated with hydraulic fractures induced by the fracturing activities. The acoustic energy or sounds associated with rock stresses, deformations, and fracturing can be detected and collected by sensors. In some instances, microseismic events have low-energy (e.g., with the value of the log of the intensity or moment magnitude of less than three), and some uncertainty or accuracy or measurement error is associated with the event locations. The uncertainty can be described, for example, by a prolate spheroid, where the highest likelihood is at the spheroid center and the lowest likelihood is at the edge.

Microseismic event mapping can be used to geometrically locate the source point of the microseismic events based on the detected compressional and shear waves. The detected compressional and shear waves (e.g., p-waves and s-waves) can yield additional information about microseismic events, including the location of the source point, the event's location and position measurement uncertainty, the event's occurrence time, the event's moment magnitude, the direction of particle motion and energy emission spectrum, and possibly others. The microseismic events can be monitored in real time, and in some instances, the events are also processed in real time during the fracture treatment. In some instances, after the fracture treatment, the microseismic events collected from the treatment are processed together as "post data."

Processing microseismic event data collected from a fracture treatment can include fracture matching (also called fracture mapping). Fracture matching processes can identify fracture planes in any zone based on microseismic events collected from the zone. Some example computational algorithms for fracture matching utilize microseismic event data (e.g., an event's location, an event's location measurement uncertainty, an event's moment magnitude, etc.) to identify individual fractures that match the collected set of microseismic events. Some example computational algorithms can compute statistical properties of fracture patterns. The statistical properties may include, for example, fracture orientation, fracture orientation trends, fracture size (e.g., length, height, area, etc.), fracture density, fracture complexity, fracture network properties, etc. Some computational algorithms account for uncertainty in the events' location by using multiple realizations of the microseismic event locations. For example, alternative statistical realizations associated with Monte Carlo techniques can be used for a defined probability distribution on a spheroid or another type of distribution.

Generally, fracture matching algorithms can operate on real-time data, post data, or any suitable combination of these and other types of data. Some computational algorithms for fracture matching operate only on post data. Algorithms operating on post data can be used when any subset or several subsets of microseismic data to be processed has been collected from the fracture treatment; such algorithms can access (e.g., as an initial input) the full subset of microseismic events to be processed. In some implementations, fracture matching algorithms can operate on real-time data. Such algorithms may be used for real-time automatic fracture matching during the fracture treatment. Algorithms operating on real-time data can be used during the fracture treatment, and such algorithms can adapt or dynamically update a previously-identified fracture model to reflect newly-acquired microseismic events. For example, once a microseismic event is detected and collected from the treatment field, a real-time automatic fracture matching algorithm may respond to this event by dynamically identifying and extracting fracture planes from the already-collected microseismic events in a real-time fashion. Some computational algorithms for fracture matching can operate on a combination of post data and real-time data.

In some cases, fracture mapping algorithms are configured to handle conditions that arise in real-time microseismic data processing. For example, several types of challenges or conditions may occur more predominantly in the real-time context. In some instances, real-time processing techniques can be adapted to account for (or to reduce or avoid) the lower accuracy that is sometimes associated with fractures extracted from data sets lacking a sufficient number of microseismic events or lacking a sufficient number of microseismic events in certain parts of the domain. Some real-time processing techniques can be adapted to produce fracture data that are consistent with the fracture data obtainable from post data processing techniques. For example, some of the example real-time processing techniques described here have produced results that are statistically the same, according to the statistical hypothesis test (t test and F test), as results produced by post data processing techniques on the same data.

In some cases, real-time processing techniques can be adapted to readily (e.g., instantaneously, from a user's perspective) offer the identified fracture data to users. Such features may allow field engineers or operators to dynamically obtain fracture geometric information and adjust fracture treatment parameters when appropriate (e.g. to improve, enhance, optimize, or otherwise change the treatment). In some instances, fracture planes are dynamically extracted from microseismic data and displayed to field engineers in real time. Real-time processing techniques can exhibit high-speed performance. In some cases, the performance can be enhanced by parallel computing technology, distributed computing technology, parallel threading approaches, fast binary-search algorithms, or a combination of these and other hardware and software solutions that facilitate the real-time operations.

In some implementations, fracture matching technology can directly present information about fractures planes associated with three-dimensional microseismic events. The fracture planes presented can represent fracture networks that exhibit multiple orientations and activate complex fracture patterns. In some cases, hydraulic fracture parameters are extracted from a cloud of microseismic event data; such parameters may include, for example, fracture orientation trends, fracture density and fracture complexity. The fracture parameter information can be presented to field engineers or operators, for example, in a tabular, numerical, or graphical interface or an interface that combines tabular, numerical, and graphical elements. The graphical interface can be presented in real time and can exhibit the real-time dynamics of hydraulic fractures. In some instances, this can help field engineers analyze the fracture complexity, the fracture network and reservoir geometry, or it can help them better understand the hydraulic fracturing process as it progresses.

In some implementations, accuracy confidence values are used to quantify the certainty of the fracture planes extracted from microseismic data. The accuracy confidence values can be used to classify the fractures into confidence levels. For example, three confidence levels (low confidence level, medium confidence level and high confidence level) are appropriate for some contexts, while in other contexts a different number (e.g., two, four, five, etc.) of confidence levels may be appropriate. A fracture plane's accuracy confidence value can be calculated based on any appropriate data. In some implementations, a fracture plane's accuracy confidence value is calculated based on the microseismic events' locations and position uncertainties, individual microseismic events' moment magnitude, distances between individual events and their supporting fracture plane, the number of supporting events associated with the fracture plane, and the weight of variation of the fracture orientation, among others.

The accuracy confidence values can be computed and the fracture planes can be classified at any appropriate time. In some cases, the accuracy confidence values are computed and the fracture planes are classified in real time during the fracture treatment. The fracture planes can be presented to the user at any appropriate time and in any suitable format. In some instances, the fracture planes are presented graphically in a user interface in real time according to the accuracy confidence values, according to the accuracy confidence levels, or according to any other type of classification. In some instances, users can select individual groups or individual planes (e.g., those with high confidence levels) for viewing or analysis. The fracture planes can be presented to the user in an algebraic format, a numerical format, graphical format, or a combination of these and other formats.

In some implementations, microseismic events are monitored in real time during the hydraulic fracture treatment. As the events are monitored, they may also be processed in real time, they may be processed later as post data, or they may be processed using a combination of real time and post data processing. The events may be processed by any suitable technique. In some cases, the events are processed individually, at the time and in the order in which they are received. For example, a system state $S(M, N-1)$ can be used to represent the M number of planes generated from the $N-1$ previous events. The new incoming $N^{th}$ event can trigger the system $S(M, N-1)$. In some cases, upon receiving the $N^{th}$ event, a histogram or distribution of orientation ranges is generated. For example, a probability distribution histogram or the Hough transform histogram of the degenerated planes in the strike and dip angle domain can be generated to identify the feasible dominant orientations imbedded in the fractures sets.

A basic plane can be generated from a subset of microseismic events. For example, any three non-collinear points in space mathematically define a basic plane. The basic plane defined by three non-collinear microseismic events can be represented by the normal vector (a, b, c). The normal vector (a, b, c) may be computed based on the three events' positions. The basic plane's orientation can be computed from the normal vector. For example, the dip $\theta$ and the strike $\varphi$ can be given by $$\theta = \arctan\frac{\sqrt{a^2+b^2}}{c}, \varphi = \arctan\frac{b}{a}. \quad (1)$$

The dip angle $\theta$ of a fracture plane can represent the angle between the fracture plane and the horizontal plane (e.g., the xy-plane). The strike angle $\varphi$ of a fracture plane can represent the angle between a horizontal reference axis (e.g., the x-axis) and a horizontal line where the fracture plane intersects the horizontal plane. For example, the strike angle can be defined with respect to North or another horizontal reference direction. A fracture plane can be defined by other parameters, including angular parameters other than the strike angle and dip angle.

In general, N events can support P basic planes, where $P=N(N-1)(N-2)/6$, strike and dip angles. A probability histogram can be constructed from the orientation angles. The probability histogram or the enhanced Hough transformation histogram can have any suitable configuration. For example, the histogram configuration can be based on a fixed bin size and a fixed number of bins, natural optimal bin size in the strike and dip angle domain, or other types of bins. The histogram can be based on any suitable number of microseismic events (e.g., tens, hundreds, thousands, etc.), and any suitable range of orientations. In some cases, multiple discrete bins are defined for the histogram, and each bin represents a discrete range of orientations. A quantity of basic planes in each discrete range can be computed from the basic planes. In some cases, each basic plane's orientation falls within the orientation range associated with one of the bins. For example, for N microseismic events, each of the P basic planes can be assigned to a bin, and the quantity of basic planes assigned to each bin can be computed. The quantity computed for each bin can be any suitable value. For example, the quantity can be a non-normalized number of basic planes, the quantity can be a normalized probability, frequency, or fraction of basic planes, or the quantity can be another type of value that is suitable for a histogram. A histogram can be generated to represent the quantity of basic planes assigned to all of the bins, or to represent the quantity of basic planes assigned to a subset of the bins. Example techniques for generating, updating, and using histograms based on microseismic data are described in U.S. Provisional Application No. 61/710,582, filed on Oct. 5, 2012.

In some examples, the histogram is presented as a three-dimensional bar chart, a three-dimensional surface map, or another suitable plot in an appropriate coordinate system. The peaks on the histogram plot can indicate dominant fracture orientations. For example, along one axis the histogram may represent strike angles from 0° through 360° (or another range), and the strike angles can be divided into any suitable number of bins; along another axis the histogram may represent dip angles from 60° through 90° (or another range), and the dip angles can be divided into any suitable number of bins. The quantity (e.g., probability) for each bin can be represented along a third axis in the histogram. The resulting plot can exhibit local maxima (peaks). Each local maximum (peak) can indicate a respective strike angle and dip angle that represents a dominant fracture orientation. For example, the local maximum of the histogram may indicate that more basic planes are aligned along this direction (or range of directions) than along neighboring directions, and these basic planes are either closely parallel or substantially on the same plane.

The orientation range represented by each bin in the histogram can be determined by any appropriate technique. In some cases, each bin represents a pre-determined range of orientations. For example, the fixed bin size method can be used. In some cases, the range or size for each bin is computed based on the data to be represented by the histogram. For example, the natural optimal bin size method can be used. In some instances, the basic plane orientations are sorted, and clusters of sorted orientations are identified. For example, all strikes can be sorted in a decreasing or increasing order and then grouped into clusters; similarly, all dip values can be sorted in a decreasing or increasing order and then grouped into clusters. The clusters can be associated with two-dimensional grid, and the number of basic planes in each grid cell can be counted. In some cases, this technique can generate adaptive and dynamic clusters, leading to highly accurate values for the dominant orientations. This technique and associated refinements can be implemented with $N^3 \log(N)$ computational complexity. In some cases, the bin sizes for both the strike and dip are fixed, and each basic plane's location grid cell can be explicitly determined by the associated strike and dip with $N^3$ computational complexity.

Fracture planes associated with a set of microseismic events can be extracted from the dominant orientations embedded in the histogram data. Basic planes that support the dominant orientation $(\theta, \varphi)$ may be either nearly parallel or on the same plane. Basic planes located within the same plane can be merged together, forming a new fracture plane with stronger support (e.g., representing a larger number of microseismic events). Any suitable technique can be used to merge the fracture planes. In some cases, for each dominant orientation $(\theta, \varphi)$, a normal to the plane vector is constructed with components (sin $\theta$ cos $\varphi$, sin $\theta$ sin $\varphi$, cos $\theta$). In some instances, the results are insensitive to the location of the plane, and without loss of generality, the plane can be constructed from this normal vector (e.g., assuming the origin is in the plane). The plane can be described by x sin $\theta$ cos $\varphi$+y sin θ sin φ+z cos θ=0. The normal signed distance of each event $(x_0, y_0, z_0)$ from a basic plane to the constructed plane can be represented $d = -(x_0 \sin\theta\cos\phi + y_0 \sin\theta\sin\phi + x_0 \cos\theta)$. In this representation, events with opposite signs of d are located opposite sides of the plane.

In some cases, microseismic events are grouped into clusters based on their distance from the constructed fracture planes. For example, a cluster of events can contain the group of events closest to a constructed fracture plane. As such, each cluster of microseismic events can support a particular fracture plane. The cluster size refers to the number of the events the cluster contains. In some cases, user input or other program data can designate a minimum number of events in a sustained cluster. The minimum cluster size can depend on the number of microseismic events in the data. In some instances, the minimum cluster size should be larger than or equal three. For example, clusters having a size larger than or equal to the minimum cluster size can be considered legitimate fracture planes. A fitting algorithm can be applied to the location and location uncertainty values for the events in each cluster to find their corresponding fracture plane.

Any suitable technique can be used to identify a fracture plane from a set of microseismic events. In some cases, a Chi-square fitting technique is used. Given K observed microseismic events, the locations can be represented $(x_i, y_i, z_i)$, and their measurement uncertainties can be represented $(\sigma_{i,x}, \sigma_{i,y}, \sigma_{i,z})$, where $1 \le i \le K$. The parameters of the plane model $z = ax + by + c$ can be calculated, for example, by minimizing the Chi-square merit function $$\chi^2(a, b, c) = \sum_{i=1}^{K} \frac{(z_i - ax_i - by_i - c)^2}{\sigma_{i,z}^2 + a^2\sigma_{i,x}^2 + b^2\sigma_{i,y}^2} \quad (2)$$

The Chi-square merit function can be solved by any suitable technique. In some instances, a solution can be obtained by solving three equations, which are the partial derivatives of $\chi^2$ (a, b, c) with respect to its variables, where each partial derivative is forced to zero. In some instances, there is no analytical solution for this nonlinear mathematical system of equations. Numerical methods (e.g., Newton's numerical method, the Newton Rafson method, the conjugate gradient method, or another technique) can be applied to solve for the parameters a, b and c, and the strike and dip angles can be computed (e.g., using equation (1) above). The orientation of the dominant fracture plane computed from the microseismic events can be the same as, or it can be slightly different from, the dominant fracture orientation identified from the histogram.

In some implementations, an algorithm iterates over all possible dominant orientations to expand all feasible fracture planes. In some cases, the algorithm iterates over a selected subset of possible dominant orientations. The iterations can converge to planes. Some planes may be exactly equal to each other and some may be close to each other. Two planes can be considered "close" to each other, for example, when the average distance of one plane's events from another plane is less than a given threshold. The threshold distance can be designated, for example, as a control parameter. The algorithm can merge close planes together and the support events of one plane can be associated with the support events of the other merged plane(s).

In some cases, constraints are imposed on the fracture planes identified from the microseismic data. For example, in some cases, the distance residual of events must be less than a given tolerance distance. The tolerance distance can be designated, for example, as a control parameter. In some instances, the identified fracture planes need to be properly truncated to represent the finite size of fractures. The boundary of truncated planes can be calculated from the support events' position and the events' location measurement uncertainty. The new finite-size fracture planes can be merged with the already-identified fractures.

In some instances, a new incoming $N^{th}$ microseismic event is associated with the fracture planes already identified based on the previous N−1 microseismic events. Upon associating the new event with an existing fracture, an algorithm can be used to update the existing fracture. For example, updating the fracture may change the fracture's geometry, location, orientation, or other parameters. Upon choosing one of the previously-identified fracture planes, the fracture plane's distance from the new event can be calculated. If the distance is less than or equal to the distance control parameter, the new event can be added to the supporting event set for the fracture plane. If the distance is larger than the distance control parameter, other previously-identified fracture planes can be selected (e.g., iteratively or recursively) until a plane within the threshold distance is found. After the new event is added to a support set for a fracture plane, new strike and dip values can be evaluated and if needed can be re-calculated (e.g., using the Chi-square fitting method, or another statistical or deterministic technique) for the fracture plane. Typically, re-calculating the fracture parameters causes limited change in the orientation due to the conditional control of the distance.

In some cases, when a new microseismic event is associated with a fracture plane, one or more parameters (e.g., distance residual, area, etc.) can be modified or optimized. The plane's distance residual r can represent the average distance from the supporting events to the plane. If the distance residual is less than the given residual tolerance T, the new event can be flagged to the associated events set for the plane. In some cases, an additional process, via which other associated events of the supporting set are taken-off the list, is launched and is terminated when the distance residual r falls within the given T. A fracture plane's area can represent the size of the fracture plane. Experience shows that usually a new event causes the fracture plane to propagate in length, grow in height, or both. Thus computational processes can be constrained by a non-decreasing area condition, whereby the new plane's area should grow larger than or remain equal to that of the original plane (rather than shrink) when the new event is added to the plane.

A fracture plane's orientation can represent the angle of the fracture plane. For example, a normal vector, the strike and dip angles, or other suitable parameters can be used to represent the fracture plane orientation. A change in a fracture plane's orientation (or other changes to a fracture plane) can cause some associated support events to be removed out of the associated events list to the un-associated event list based on their distance from the updated fracture plane. Additionally or alternatively, a change in a fracture plane's orientation can cause some previously-unassociated events to be assigned to the fracture plane based on their proximity to the updated fracture plane. Additionally, some events associated with nearby planes may also be associated with the current plane. If a new event is associated to two fracture planes, the fracture planes may intersect each other. In some cases, intersecting planes can be merged. If the new event does not belong to any existing fracture plane, it can be assigned to the "unassociated events" list.

The accumulated N microseismic events can be considered at any point to be a subset of the final post data event set. In such cases, the histogram or distribution of orientations based on the first N events may be different from the histogram or distribution of orientations constructed from the final post data. Some fracture planes extracted from N microseismic events may not be accurate, and this inaccuracy can decrease as time increases and more events are accumulated. As an example, accuracy and confidence may be lower at an initial time when the detected fracture planes are associated with microseismic events located close to the well bore. Such data may indicate fracture planes that are nearly parallel to the wellbore, even if those planes do not represent real fractures.

Fracture accuracy confidence can be used as a measure for the certainty associated with fracture planes identified from microseismic data. In some cases, the accuracy confidence is identified in real time during the fracture treatment. The accuracy confidence can be determined from any suitable data using any suitable calculations. In some cases, the accuracy confidence value for a fracture plane is influenced by the number of microseismic events associated with the fracture plane. For example, the accuracy confidence value can scale (e.g., linearly, non-linearly, exponentially, polynomially, etc.) with the number of microseismic events according to a function. The number of microseismic events associated with a fracture plane can be incorporated (e.g., as a weight, an exponent, etc.) in an equation for calculating the accuracy confidence. In some instances, a fracture plane has a higher confidence value when the fracture plane is supported by a larger number of microseismic data points (or a lower confidence value when the fracture plane is supported by a smaller number of microseismic data points).

In some cases, the accuracy confidence value for a fracture plane is influenced by the location uncertainty for the microseismic events associated with the fracture plane. For example, the accuracy confidence value can scale (e.g., linearly, non-linearly, exponentially, polynomially, etc.) with the microseismic event's location uncertainty according to a function. The microseismic event's location uncertainty can be incorporated (e.g., as a weight, an exponent, or any decaying function of the distance, etc.) in an equation for calculating the accuracy confidence. In some instances, a fracture plane has a higher confidence value when the fracture plane is supported by microseismic data points having lower uncertainty (or a lower confidence value when the fracture plane is supported by microseismic data points having higher uncertainty).

In some cases, the accuracy confidence value for a fracture plane is influenced by the moment magnitude for the microseismic events associated with the fracture plane. For example, the accuracy confidence value can scale (e.g., linearly, non-linearly, exponentially, polynomially, etc.) with the microseismic event's moment magnitude according to a function. The microseismic event's moment magnitude can be incorporated (e.g., as a weight, an exponent, etc.) in an equation for calculating the accuracy confidence. The moment magnitude for a microseismic event can refer to the energy or intensity (sometimes proportional to the square of the amplitude) of the event. For example, the moment magnitude for a microseismic event can be a logarithmic scale value of the energy or intensity, or another type of value representing energy intensity. In some instances, a fracture plane has a higher confidence value when the fracture plane is supported by microseismic data points having higher intensity (or a lower confidence value when the fracture plane is supported by microseismic data points having lower intensity).

In some cases, the accuracy confidence value for a fracture plane is influenced by the distance between the fracture plane and the microseismic events associated with the fracture plane. For example, the accuracy confidence value can scale (e.g., linearly, non-linearly, exponentially, polynomially, etc.) with the average distance between the fracture plane and the microseismic events supporting the fracture plane. The average distance can be incorporated (e.g., as a weight, an exponent, etc.) in an equation for calculating the accuracy confidence. In some instances, a fracture plane has a higher confidence value when the fracture plane is supported by microseismic data points that are, on average, closer to the fracture plane (or a lower confidence value when the fracture plane is supported by microseismic data points that are, on average, farther from the fracture plane).

In some cases, the accuracy confidence value for a fracture plane is influenced by the fracture plane's orientation with respect to a dominant orientation trend in the microseismic data set. For example, the accuracy confidence value can scale (e.g., linearly, non-linearly, exponentially, polynomially, etc.) with the angular difference between the fracture plane's orientation and a dominant orientation trend in the microseismic data. The orientation angles can include strike, dip or any relevant combination (e.g., a three-dimensional spatial angle). The orientation can be incorporated (e.g., as a weight, an exponent, etc.) in an equation for calculating the accuracy confidence. A microseismic data set can have one dominant orientation trend or it can have multiple dominant orientation trends. Dominant orientation trends can be classified, for example, as primary, secondary, etc. In some instances, a fracture plane has a higher confidence value when the fracture plane is aligned with a dominant orientation trend in the microseismic data set (or a lower confidence value when the fracture plane is deviated from the dominant orientation trend in the microseismic data set).

A weighting value called the "weight of variation of fracture orientation" can represent the angular difference between the fracture plane's orientation and a dominant orientation trend in the microseismic data. The weight of variation of fracture orientation can be a scalar value that is a maximum when the fracture plane is aligned with a dominant orientation trend. The weight of variation of fracture orientation can be a minimum for fracture orientations that are maximally separated from a dominant fracture orientation trend. For example, when there is a single dominant fracture orientation trend, the weight of variation of fracture orientation can be zero for fractures that are perpendicular (or normal) to the dominant fracture orientation. As another example, when there are multiple dominant fracture orientation trends, the weight of variation of fracture orientation can be zero for fractures having orientations between the dominant fracture orientations. The weight of variation of the fracture orientation can be the ratio of the calculated plane's orientation and the orientation reflected by the homogeneous case.

In some cases, when there are multiple dominant fracture orientation trends, the weight of variation of fracture orientation has the same maximum value for each dominant fracture orientation trend. In some cases, when there are multiple dominant fracture orientations, the weight of variation of fracture orientation has a different local maximum value for each dominant fracture orientation. For example, the weight of variation of fracture orientation can be 1.0 for fractures that are parallel to a first dominant fracture orientation trend, 0.8 for fractures that are parallel to a second dominant fracture orientation trend, and 0.7 for fractures that are parallel to a third dominant fracture orientation trend. The weight of variation of fracture orientation can decrease to local minima between the dominant fracture orientations trend. For example, the weight of variation of fracture orientation between each neighboring pair of dominant fracture orientations can define a local minimum half way between the dominant fracture orientations or at another point between the dominant fracture orientations.

The accuracy confidence parameter can be influenced by the supporting microseismic events' location uncertainty, the supporting microseismic events' moment magnitude, distance between the supporting microseismic events and the fracture plane, the number of supporting events associated with the plane, the weight of variation of fracture orientation, other values, or any appropriate combination of one or more of these. In some general models, the confidence increases as moment magnitude is larger, and as the variation of the fraction orientation becomes larger, and the number of supporting events is larger, and their accuracy in their location is larger, and as the variation of the weight as a function of the distance is larger. These factors can be used as inputs for defining weight in an equation for the accuracy confidence. For example, in some models, the weights are linear or nonlinear functions of these factors and the weight of variation of the fracture orientation may appear with higher weight when influencing the plane's confidence. In some examples, the accuracy confidence is calculated as:

$$\text{Confidence} = (\text{weight of variation of fracture orientation}) * \sum_{i=1}^{number\ of\ events} ((\text{location uncertainty weight}) * (\text{moment magnitude weight}) * (\text{distance variation weight})). \quad (3)$$

Other equations or algorithms can be used to compute the confidence.

The identified fracture planes can be classified into confidence levels based on the fracture planes' accuracy confidence values. In some instances, three levels are used: low confidence level, medium confidence level and high confidence level. Any suitable number of confidence levels can be used. In some examples, when a new event is added to the supporting set associated with an existing fracture plane, its associated fracture confidence parameter may increase, which may cause the fracture plane to roll from its current confidence level to a higher one, if it exists. As another example, if a fracture's orientation diverts away from orientation trends exhibited by post microseismic event data, as microseismic events gradually accumulate, a decrease in fracture confidence may be induced, mainly by the weight of variation of fracture orientation, causing the plane to decrease its level to a lower confidence level, if it exists. This may particularly apply to fractures created at the initial time of hydraulic fracturing treatment; it may also apply to other types of fractures in other contexts.

Users (e.g., field engineers, operational engineers and analysts, and others) can be provided a graphical display of the fracture planes identified from the microseismic data. In some cases, the graphical display allows the user to visualize the identified planes in a real time fashion, in graphical panels presenting the confidence levels. For example, three graphical panels can be used to separately present the low confidence level, medium confidence level and high confidence level fracture planes. In some cases, the lower confidence level fracture planes are created in the initial times of the fracturing treatment. In some cases, higher confidence level fracture planes propagate in time in the direction nearly perpendicular to the wellbore. As new microseismic events gradually accumulate in time, the graphical display can be updated to enable users to dynamically observe the fracture planes association among confidence levels associated with the graphical panels.

The confidence level groups can be presented as plots of the fracture planes, or the confidence level groups can be presented in another format. The confidence level groups can be presented algebraically, for example, by showing the algebraic parameters (e.g., parameters for the equation of a plane) of the fracture planes in each group. The confidence level groups can be presented numerically, for example, by showing the numerical parameters (e.g., strike, dip, area, etc.) of the fracture planes in each group. The confidence level groups can be presented in a tabular form, for example, by presenting a table of the algebraic parameters or numerical parameters of the fracture planes in each group. Moreover, a fracture plane can be represented graphically in a three-dimensional space, a two-dimensional space, or another space. For example, a fracture plane can be represented in a rectilinear coordinate system (e.g., x, y, z coordinates) in a polar coordinate system (e.g., r, θ, φ coordinates), or another coordinate system. In some examples, a fracture plane can be represented as a line at the fracture plane's intersection with another plane (e.g., a line in the xy-plane, a line in the xz-plane, a line in the yz-plane, or a line in any arbitrary plane or surface).

In some instances, a graphical display allows users to track and visualize spatial and temporal evolution of specific fracture planes, including their generation, propagation and growth. For example, a user may observe stages of a specific fracture plane's spatial and temporal evolution such as, for example, initially identifying the fracture plane based on three microseismic events, a new event that changes the plane's orientation, a new event that causes the planes' area to grow (e.g., vertically, horizontally, or both), or other stages in the evolution of a fracture plane. The spatial and temporal evolution of fracture planes may present the travel paths of stimulated fluids and proppants injected into the rock matrix. Visualization of dynamics of fracture planes can help users better understand the hydraulic fracturing process, analyze the fracture complexity more accurately, evaluate the effectiveness of hydraulic fracture, or improve the well performance.

Although this application describes examples involving microseismic event data, the techniques and systems described in this application can be applied to other types of data. For example, the techniques and systems described here can be used to process data sets that include data elements that are unrelated to microseismic events, which may include other types of physical data associated with a subterranean zone. In some aspects, this application provides a framework for processing large volumes of data, and the framework can be adapted for various applications that are not specifically described here. For example, the techniques and systems described here can be used to analyze spatial coordinates, orientation data, or other types of information collected from any source. As an example, soil or rock samples can be collected (e.g., during drilling), and the concentration of a given compound (e.g., a certain "salt") as function of location can be identified. This may help geophysicists and operators evaluate the geo-layers in the ground.

FIG. 1A shows a schematic diagram of an example well system 100 with a computing subsystem 110. The example well system 100 includes a treatment well 102 and an observation well 104. The observation well 104 can be located remotely from the treatment well 102, near the treatment well 102, or at any suitable location. The well system 100 can include one or more additional treatment wells, observation wells, or other types of wells. The computing subsystem 110 can include one or more computing devices or systems located at the treatment well 102, at the observation well 104, or in other locations. The computing subsystem 110 or any of its components can be located apart from the other components shown in FIG. 1A. For example, the computing subsystem 110 can be located at a data processing center, a computing facility, or another suitable location. The well system 100 can include additional or different features, and the features of the well system can be arranged as shown in FIG. 1A or in any other suitable configuration.

The example treatment well 102 includes a well bore 101 in a subterranean zone 121 beneath the surface 106. The subterranean zone 121 can include one or less than one rock formation, or the subterranean zone 121 can include more than one rock formation. In the example shown in FIG. 1A, the subterranean zone 121 includes various subsurface layers 122. The subsurface layers 122 can be defined by geological or other properties of the subterranean zone 121. For example, each of the subsurface layers 122 can correspond to a particular lithology, a particular fluid content, a particular stress or pressure profile, or any other suitable characteristic. In some instances, one or more of the subsurface layers 122 can be a fluid reservoir that contains hydrocarbons or other types of fluids. The subterranean zone 121 may include any suitable rock formation. For example, one or more of the subsurface layers 122 can include sandstone, carbonate materials, shale, coal, mudstone, granite, or other materials.

The example treatment well 102 includes an injection treatment subsystem 120, which includes instrument trucks 116, pump trucks 114, and other equipment. The injection treatment subsystem 120 can apply an injection treatment to the subterranean zone 121 through the well bore 101. The injection treatment can be a fracture treatment that fractures the subterranean zone 121. For example, the injection treatment may initiate, propagate, or open fractures in one or more of the subsurface layers 122. A fracture treatment may include a mini fracture test treatment, a regular or full fracture treatment, a follow-on fracture treatment, a re-fracture treatment, a final fracture treatment or another type of fracture treatment.

The fracture treatment can inject a treatment fluid into the subterranean zone 121 at any suitable fluid pressures and fluid flow rates. Fluids can be injected above, at or below a fracture initiation pressure, above at or below a fracture closure pressure, or at any suitable combination of these and other fluid pressures. The fracture initiation pressure for a formation is the minimum fluid injection pressure that can initiate or propagate artificial fractures in the formation. Application of a fracture treatment may or may not initiate or propagate artificial fractures in the formation. The fracture closure pressure for a formation is the minimum fluid injection pressure that can dilate existing fractures in the subterranean formation. Application of a fracture treatment may or may not dilate natural or artificial fractures in the formation.

A fracture treatment can be applied by any appropriate system, using any suitable technique. The pump trucks 114 may include mobile vehicles, immobile installations, skids, hoses, tubes, fluid tanks or reservoirs, pumps, valves, or other suitable structures and equipment. In some cases, the pump trucks 114 are coupled to a working string disposed in the well bore 101. During operation, the pump trucks 114 can pump fluid through the working string and into the subterranean zone 121. The pumped fluid can include a pad, proppants, a flush fluid, additives, or other materials.

A fracture treatment can be applied at a single fluid injection location or at multiple fluid injection locations in a subterranean zone, and the fluid may be injected over a single time period or over multiple different time periods. In some instances, a fracture treatment can use multiple different fluid injection locations in a single well bore, multiple fluid injection locations in multiple different well bores, or any suitable combination. Moreover, the fracture treatment can inject fluid through any suitable type of well bore, such as, for example, vertical well bores, slant well bores, horizontal well bores, curved well bores, or any suitable combination of these and others.

A fracture treatment can be controlled by any appropriate system, using any suitable technique. The instrument trucks 116 can include mobile vehicles, immobile installations, or other suitable structures. The instrument trucks 116 can include an injection control system that monitors and controls the fracture treatment applied by the injection treatment subsystem 120. In some implementations, the injection control system can communicate with other equipment to monitor and control the injection treatment. For example, the instrument trucks 116 may communicate with the pump truck 114, subsurface instruments, and monitoring equipment.

The fracture treatment, as well as other activities and natural phenomena, can generate microseismic events in the subterranean zone 121, and microseismic data can be collected from the subterranean zone 121. For example, the microseismic data can be collected by one or more sensors 112 associated with the observation well 104, or the microseismic data can be collected by other types of systems. The microseismic information detected in the well system 100 can include acoustic signals generated by natural phenomena, acoustic signals associated with a fracture treatment applied through the treatment well 102, or other types of signals. For example, the sensors 112 may detect acoustic signals generated by rock slips, rock movements, rock fractures or other events in the subterranean zone 121. In some instances, the locations of individual microseismic events can be determined based on the microseismic data.

Microseismic events in the subterranean zone 121 may occur, for example, along or near induced hydraulic fractures. The microseismic events may be associated with pre-existing natural fractures or hydraulic fracture planes induced by fracturing activities. In some environments, the majority of detectable microseismic events are associated with shear-slip rock fracturing. Such events may or may not correspond to induced tensile hydraulic fractures that have significant width generation. The orientation of a fracture can be influenced by the stress regime, the presence of fracture systems that were generated at various times in the past (e.g., under the same or a different stress orientation). In some environments, older fractures can be cemented shut over geologic time, and remain as planes of weakness in the rocks in the subsurface.

The observation well 104 shown in FIG. 1A includes a well bore 111 in a subterranean region beneath the surface 106. The observation well 104 includes sensors 112 and other equipment that can be used to detect microseismic information. The sensors 112 may include geophones or other types of listening equipment. The sensors 112 can be located at a variety of positions in the well system 100. In FIG. 1A, sensors 112 are installed at the surface 106 and beneath the surface 106 in the well bore 111. Additionally or alternatively, sensors may be positioned in other locations above or below the surface 106, in other locations within the well bore 111, or within another well bore. The observation well 104 may include additional equipment (e.g., working string, packers, casing, or other equipment) not shown in FIG. 1A. In some implementations, microseismic data are detected by sensors installed in the treatment well 102 or at the surface 106, without use of an observation well.

In some cases, all or part of the computing subsystem 110 can be contained in a technical command center at the well site, in a real-time operations center at a remote location, in another appropriate location, or any suitable combination of these. The well system 100 and the computing subsystem 110 can include or access any suitable communication infrastructure. For example, well system 100 can include multiple separate communication links or a network of interconnected communication links. The communication links can include wired or wireless communications systems. For example, sensors 112 may communicate with the instrument trucks 116 or the computing subsystem 110 through wired or wireless links or networks, or the instrument trucks 116 may communicate with the computing subsystem 110 through wired or wireless links or networks. The communication links can include a public data network, a private data network, satellite links, dedicated communication channels, telecommunication links, or any suitable combination of these and other communication links.

The computing subsystem 110 can analyze microseismic data collected in the well system 100. For example, the computing subsystem 110 may analyze microseismic event data from a fracture treatment of a subterranean zone 121. Microseismic data from a fracture treatment can include data collected before, during, or after fluid injection. The computing subsystem 110 can receive the microseismic data at any suitable time. In some instances, the computing subsystem 110 receives the microseismic data in real time (or substantially in real time) during the fracture treatment. For example, the microseismic data may be sent to the computing subsystem 110 immediately upon detection by the sensors 112. In some instances, the computing subsystem 110 receives some or all of the microseismic data after the fracture treatment has been completed. The computing subsystem 110 can receive the microseismic data in any suitable format. For example, the computing subsystem 110 can receive the microseismic data in a format produced by microseismic sensors or detectors, or the computing subsystem 110 can receive the microseismic data after the microseismic data has been formatted, packaged, or otherwise processed. The computing subsystem 110 can receive the microseismic data by any suitable means. For example, the computing subsystem 110 can receive the microseismic data by a wired or wireless communication link, by a wired or wireless network, or by one or more disks or other tangible media.

The computing subsystem 110 can implement cascading updates that are initiated based on newly-available information. For example, upon receiving a new microseismic event or other new information, the computing system 110 can identify a previously-generated data item (e.g., a fracture plane) to be updated based on the new microseismic event. After updating the previously-generated data item, the effects of updating that data item can be propagated to other previously-generated data items (e.g., to other fracture planes). In some cases, the cascading updates can propagate in series, in parallel, or in another manner, and the updates can be propagated to a discrete subset of the previously-generated data items, or to all of the previously-generated data items. A threshold can be applied, for example, to terminate the cascading effect and prevent further updates when the effect of such further updates is unlikely to produce valuable information.

Some of the techniques and operations described herein may be implemented by a computing subsystem configured to provide the functionality described. In various embodiments, a computing device may include any of various types of devices, including, but not limited to, personal computer systems, desktop computers, laptops, notebooks, mainframe computer systems, handheld computers, workstations, tablets, application servers, storage devices, or any type of computing or electronic device.

Figure 1B:
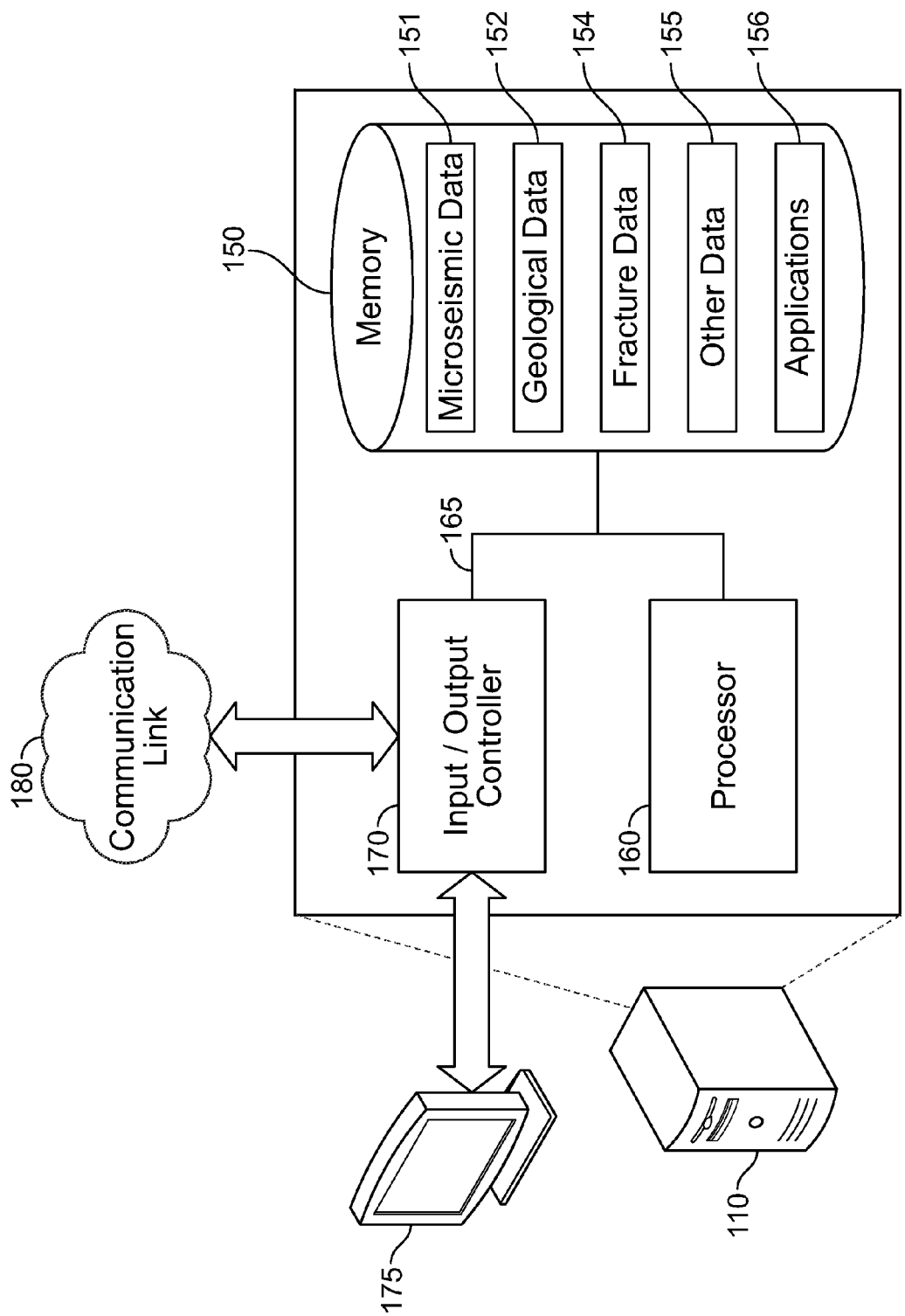
FIG. 1B is a diagram of the example computing subsystem 110 of FIG. 1A.

FIG. 1B is a diagram of the example computing subsystem 110 of FIG. 1A. The example computing subsystem 110 can be located at or near one or more wells of the well system 100 or at a remote location. All or part of the computing subsystem 110 may operate independent of the well system 100 or independent of any of the other components shown in FIG. 1A. The example computing subsystem 110 includes a processor 160, a memory 150, and input/output controllers 170 communicably coupled by a bus 165. The memory can include, for example, a random access memory (RAM), a storage device (e.g., a writable read-only memory (ROM) or others), a hard disk, or another type of storage medium. The computing subsystem 110 can be preprogrammed or it can be programmed (and reprogrammed) by loading a program from another source (e.g., from a CD-ROM, from another computer device through a data network, or in another manner). The input/output controller 170 is coupled to input/output devices (e.g., a monitor 175, a mouse, a keyboard, or other input/output devices) and to a communication link 180. The input/output devices receive and transmit data in analog or digital form over communication links such as a serial link, a wireless link (e.g., infrared, radio frequency, or others), a parallel link, or another type of link.

The communication link 180 can include any type of communication channel, connector, data communication network, or other link. For example, the communication link 180 can include a wireless or a wired network, a Local Area Network (LAN), a Wide Area Network (WAN), a private network, a public network (such as the Internet), a WiFi network, a network that includes a satellite link, or another type of data communication network.

The memory 150 can store instructions (e.g., computer code) associated with an operating system, computer applications, and other resources. The memory 150 can also store application data and data objects that can be interpreted by one or more applications or virtual machines running on the computing subsystem 110. As shown in FIG. 1B, the example memory 150 includes microseismic data 151, geological data 152, fracture data 153, other data 155, and applications 156. In some implementations, a memory of a computing device includes additional or different information.

The microseismic data 151 can include information on the locations of microseisms in a subterranean zone. For example, the microseismic data can include information based on acoustic data detected at the observation well 104, at the surface 106, at the treatment well 102, or at other locations. The microseismic data 151 can include information collected by sensors 112. In some cases, the microseismic data 151 has been combined with other data, reformatted, or otherwise processed. The microseismic event data may include any suitable information relating to microseismic events (locations, magnitudes, uncertainties, times, etc.). The microseismic event data can include data collected from one or more fracture treatments, which may include data collected before, during, or after a fluid injection.

The geological data 152 can include information on the geological properties of the subterranean zone 121. For example, the geological data 152 may include information on the subsurface layers 122, information on the well bores 101, 111, or information on other attributes of the subterranean zone 121. In some cases, the geological data 152 includes information on the lithology, fluid content, stress profile, pressure profile, spatial extent, or other attributes of one or more rock formations in the subterranean zone. The geological data 152 can include information collected from well logs, rock samples, outcroppings, microseismic imaging, or other data sources.

The fracture data 153 can include information on fracture planes in a subterranean zone. The fracture data 153 may identify the locations, sizes, shapes, and other properties of fractures in a model of a subterranean zone. The fracture data 153 can include information on natural fractures, hydraulically-induced fractures, or any other type of discontinuity in the subterranean zone 121. The fracture data 153 can include fracture planes calculated from the microseismic data 151. For each fracture plane, the fracture data 153 can include information (e.g., strike angle, dip angle, etc.) identifying an orientation of the fracture, information identifying a shape (e.g., curvature, aperture, etc.) of the fracture, information identifying boundaries of the fracture, or any other suitable information.

The applications 156 can include software applications, scripts, programs, functions, executables, or other modules that are interpreted or executed by the processor 160. Such applications may include machine-readable instructions for performing one or more of the operations represented in FIG. 4. The applications 156 may include machine-readable instructions for generating a user interface or a plot, such as, for example, those represented in FIG. 2A, 2B, or 3. The applications 156 can obtain input data, such as microseismic data, geological data, or other types of input data, from the memory 150, from another local source, or from one or more remote sources (e.g., via the communication link 180). The applications 156 can generate output data and store the output data in the memory 150, in another local medium, or in one or more remote devices (e.g., by sending the output data via the communication link 180).

The processor 160 can execute instructions, for example, to generate output data based on data inputs. For example, the processor 160 can run the applications 156 by executing or interpreting the software, scripts, programs, functions, executables, or other modules contained in the applications 156. The processor 160 may perform one or more of the operations represented in FIG. 4 or generate one or more of the interfaces or plots shown in FIG. 2A, 2B, or 3. The input data received by the processor 160 or the output data generated by the processor 160 can include any of the microseismic data 151, the geological data 152, the fracture data 153, or the other data 155.

Figure 2:
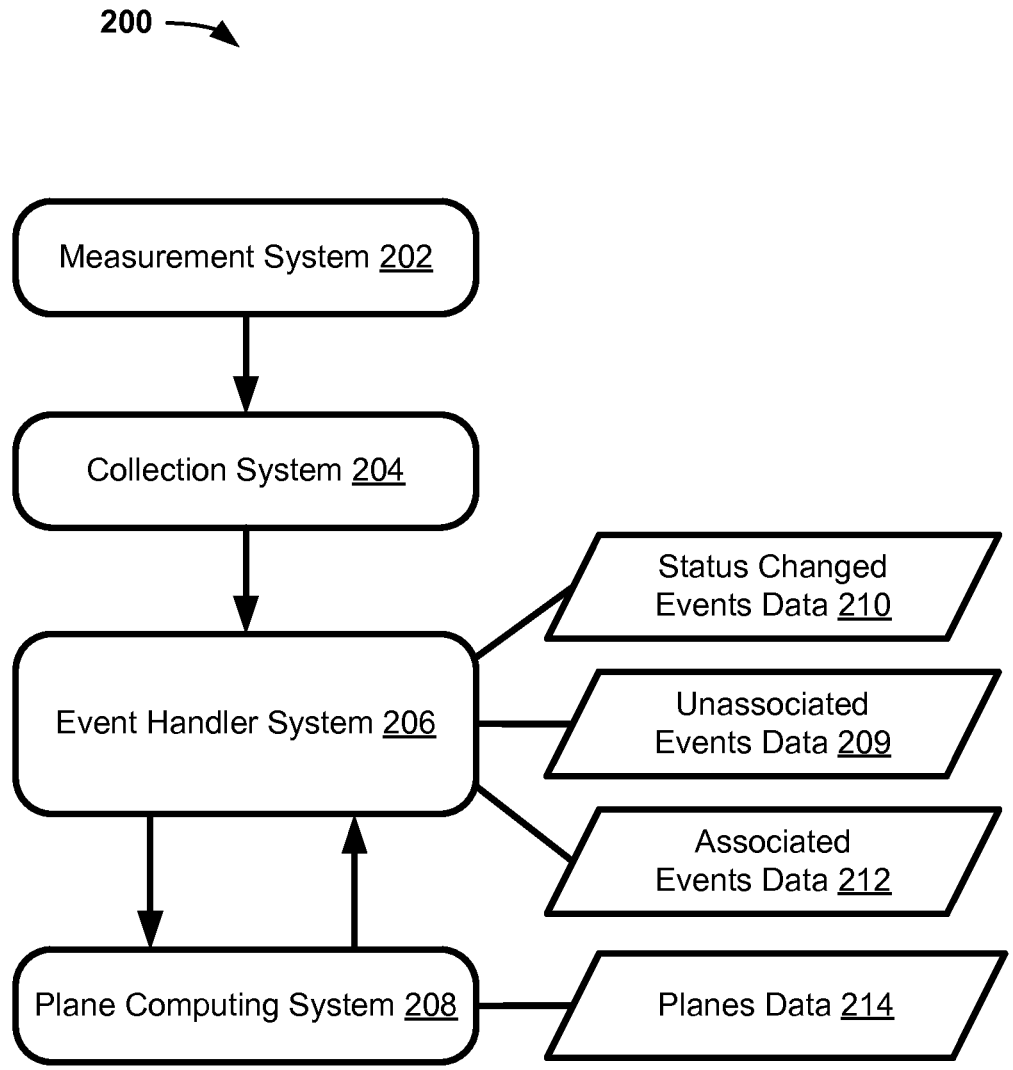
FIG. 2 is an example system for managing microseismic data.

FIG. 2 is an example system 200 for managing microseismic data. The example system 200 includes a measurement system 202, a collection system 204, an event handler system 206, a plane computing system 208, and stored data. The store data include status changed events data 210, unassociated events data 209, associated events data 212, and planes data 214. A system for managing microseismic data can include additional, fewer, or different features, which may include other types of systems, subsystems, components, and data. The components of a data management system may operate and interact as described here with respect to FIG. 2, or the components of a data management system can operate and interact in another manner.

The system components shown in FIG. 2 can be implemented as separate subsystems, or various components can be combined into a single subsystem. For example, the measurement system 202 (or certain aspects of the measurement system 202) may be combined with the collection system 204; the collection system 204 (or certain aspects of the collection system 204) may be combined with the event handler system 206; etc. As another example, the collection system 204, the event handler system 206, and the plane computing system 208 may be implemented in one or more computing systems (e.g., the computing subsystem 110 of FIG. 1B). Accordingly, components of the system shown in FIG. 2 can be located together (e.g., at or near a well system, at a data center, etc.), or the components can be distributed among multiple different locations. The components may communicate with each other over a data network, over direct communication links (e.g., wireless or wired links), over satellite connections, or over combinations of these and other types of connections.

The data shown in FIG. 2 can represent microseismic events, fracture planes generated from groups of the microseismic events, and other information. The data representing a microseismic event (or "point") can include spatial coordinates for the location (e.g., in three-dimensional space) of the microseismic event, a time-coordinate for the time at which the microseismic event was detected, uncertainty information (e.g., location uncertainty) associated with the microseismic event, moment magnitude information (e.g., indicating the energy or intensity of the microseismic event), and other information. The data shown in FIG. 2 can include a real-time set of points that increases in size over time. The increase in the size of the data set can occur, in general, in a unsynchronized manner, meaning that a new data point can be inserted to the data set in an unscheduled manner.

In some implementations, the example system 200 can optimally handle data items as they appear (e.g., in a real time fashion) on an input buffer and calculate the optimal planes that are imbedded in the real-time accumulated data points. The example system 200 may, in some instances, find, compute and monitor (e.g., in a real time fashion) the fracture planes that are imbedded in the microseismic data.

The measurement system 202 can include any hardware, software, equipment, or other systems that detect microseismic data from a subterranean zone. For example, measurement system 202 can include the sensors 112 and other components associated with the observation well 104 shown in FIG. 1, or the measurement system 202 can include other types of systems. The measurement system 202 can be configured to detect acoustic signals and to generate microseismic data based on the detected acoustic signals. For example, the measurement system 202 may calculate the location of the three-dimensional data items along with their positional error accuracy based on acoustic data detected by one or more sensors installed in or near a subterranean zone. The microseismic data from the measurement system 202 can be provided to the collection system 204.

The collection system 204 can include hardware, software, equipment, or a combination of these or other systems that collect microseismic data from the measurement system. For example, the collection system 204 can include one or more servers or other types of computing components that are communicably connected (e.g., by wired connections, wireless connections, or a combination of them) to the measurement system 202. The collection system 204 can collect the real-time data items from the measurement system 202 and pass them to the event handler system 206. For example, the collection system 204 can pass microseismic events to the event handler system 206 by storing or registering them on a buffer, input device, or input domain of the event handler system 206.

The event handler system 206 can manage microseismic events. In some cases, the event handler system 206 manages microseismic events from a fracture treatment in real time. For example, the event handler system 206 may take action (e.g., activating the planes computing system 208, etc.) on the events as soon as they are presented to it. In some cases, the event handler system 206 manages data based on real-time availability of a data item or a point. In managing data based on real-time availability of each data point, the event handler system 206 can put each data item immediately on the input buffer of the plane computing system 208 for further processing as soon as the data item is collected from the measurement system. In some cases, the event handler system 206 delays processing a data item for a period of time, for example, to allow additional data to accumulate, to allow existing processes to terminate, or for other reasons.

The event handler system 206 can define multiple categories of microseismic events. For example, the event handler system 206 can store the status changed events data 210 to indicate a set of microseismic events having a "status changed" status; the event handler system 206 can store the unassociated events data 209 to indicate a set of microseismic events having an "unassociated" status; and the event handler system 206 can store the associated events data 212 to indicate a set of microseismic events having an "associated" status. Additional, fewer, or different categories of microseismic events can be defined.

The stored data indicating the various categories of microseismic events can include lists, tables, or other data structures. For illustration purposes, the status changed events data 210, the unassociated events data 209, and the associated events data 212 can be represented by a table.

TABLE 1

|         | Plane 1 | Plane 2 | Status Changed | Un-associated |
|---------|---------|---------|----------------|---------------|
| Event A | x       |         |                |               |
| Event B |         | x       |                |               |
| Event C | x       | x       |                |               |
| Event D | x       |         |                |               |
| Event E |         |         | x              | x             |
| Event F |         |         |                | x             |
| Event G |         | x       |                |               |
| Event H |         |         | x              |               |
| Event I |         |         | x              |               |

In the example shown in Table 1, three of the events (Events A, C, and D) are associated with the first fracture plane (Plane 1), three of the events (Events B, C, and G) are associated with the second fracture plane (Plane 2), two of the events (Events E and F) are in the "unassociated" category, and three of the events (Events E, H, and I) are in the "status changed" category.

In some cases, the associated events data 212 associates each microseismic event with one or more computed fracture planes, while the status changed events data 210 and unassociated events data 209 indicates which microseismic events are not associated with a fracture plane. For the example shown in Table 1, the associated events data 212 can indicate that Events A, C, and D are associated with Plane 1 and that Events B, C, and G are associated with Plane 2; the unassociated events data 209 can indicate that Events E and F are not associated with any plane; and the status changed events data 210 can indicate that Events E, H, and I are in the status changed category.

In some cases, a microseismic event can be in a single category, in multiple categories, or it can be associated with a single fracture plane or multiple fracture planes. The events in the "status changed" category can include new events that have been received from the collection system 204 and have not yet been associated with a fracture plane. The events in the "status changed" category can also include other events that were previously associated with a fracture plane but became unassociated, for example, when the fracture plane was recalculated by the plane computing system 208. Events can be added to the "status changed" category in response to other types of conditions.

In some implementations, the status changed events data 210 indicates an ordering of the points in the status changed category. The ordering can be based on the times associated with the events, the order in which the points were added to the status changed category, or a combination of these and other data. The ordering can, in some cases, determine the order in which the status changed events are processed by the plane computing system 208.

In some aspects of operation, components of the system 200 (e.g., the event handler system 206, the plane computing system 208) may operate together or separately to execute aspects of the system's kernel or core algorithm. For example, the system 200 can operate to imbed the influence of one new data item that is presented to a set of data items and a set of previously-calculated planes. In some cases, the system 200 executes a core algorithm that includes a series of cascading steps that are automatically triggered by other steps in the algorithm, by external stimuli, or by other conditions.

In some cases, the plane computing system 208 can receive individual events or clusters of events from the event handler system 206. The plane computing system 208 can, in some instances, associate each of the "status changed" events with one of the previously-generated fracture planes. If an event cannot be associated with a fracture plane, then the event can be added to the "unassociated" category. If an event can be associated with a fracture plane, the selected fracture plane can be recalculated or re-fitted based on the newly associated event. In some cases, all points that have their status changed from associate (i.e., associated with a particular fracture plane) to unassociated are added to the "status changed" category. The operations (e.g., trying to associate "status changed" events with fracture planes, and updating the various categories, etc.) can be repeated, for example, until the "status changed" category is empty or until another condition is met. In some instances, it can be proven that the core algorithm will always converge and have a definite finite termination.

In some implementations, the event handler system 206 can properly add each new microseismic event into the "status changed" category, and the event handler system 206 can maintain and manage the events in the "status changed" category. For example, the event handler system 206 can be configured to maintains the order of the "status changed" events. If a new event reaches the "status changed" category from operations performed below (i.e., from the planes computing system 208), or from above (i.e., from the measurement system 202), the event handler system 206 can place the event properly in the sequence of events in the "status changed" category to be executed. In some instances, events in the head of the "status changed" ordering are most likely to be executed and the events in the tail of the "status changed" ordering are less likely to be executed. In some cases, the tail part of the ordering can contain events that the event handler system 206 decided temporarily not to execute.

In some cases, the status changed events data 210 can include a consolidated, ordered list of microseismic events to be processed by the plane computing system 208. The consolidated list can include new microseismic events from the collection system 204 (that have not been processed by the plane computing system 208) and older microseismic events (that have been processed by the plane computing system 208). For example, if the plane computing system 208 modifies an existing fracture plane and causes a microseismic event to become disassociated from the modified fracture plane, the plane computing system 208 can send the disassociated event to the event handler system 206. The event handler system 206 can receive the disassociated event, identify it as a "status changed" event, and update the status changed events data 210 accordingly. The disassociated event can be added to the "status changed" category along with new microseismic events that have not yet been sent to the plane computing system 208 for processing. The event handler system 206 can define an order for all of the "status changed" events, to manage the order in which the events are fed into the plane computing system 208 for execution.

In some implementations, the event handler system 206 can send a single event at a time for execution, or the event handler system 206 can send multiple events at a time for execution. For example, when one or more microseismic events are sent for execution, they can be provided to the plane computing system 208 to be imbedded into an existing system of previously-computed fracture planes. In some cases, the event handler system 206 has a default mode of operation. For example, the event handler system 206 can be configured to hand over to the plane computing system 208 the events from the "status changed" category, one by one, sorted with respect to their time stamp. Operation of the event handler system 206 can determine the order in which the "status changed" events are executed can be stored—for example, FIFO (first in first out) or another scheme can be used.

In some implementations, the event handler system 206 can use a nearest neighbor algorithm or another clustering algorithm, to maintain a set of clusters in the "status changed" category. The clusters can be sorted with respect to the time stamp of the earliest event in the cluster. For similar time stamps, the event from above (i.e., a new event from the measurement system 202) can be given priority over an event from below (i.e., an event disassociated by the plane computing system 208). The contents and the number of clusters can be changed dynamically and adaptively. After the plane computing system 208 executes a given cluster, the event handler system 206 can send the top cluster in the list to the plane computing system 208 for execution.

In some implementations, clusters with one point with old stamps (e.g., relative to some threshold) may be frozen, for example, until a flush out process is initiated. In some cases, the system may temporarily suspend itself when there are too many one-element clusters. In such instances, the system can send these clusters one by one to be executed individually. In some instances, some of them become associated with a fracture plane; in some instances, some of them end up in the unassociated category. Such operations can be executed at any time, including, for example, between the appearance of new microseismic events from above. In some cases, a "local roll-back" can be performed. For example, if a cluster is under execution by the plane computing system 208 and the event handler system 206 determines that one or more new events from above belongs with the cluster being executed, the system 200 can roll back (i.e., undo) recent calculations that have been executed, add the new event(s) to the cluster, and reinitiate execution of the updated cluster.

The system 200 can maintain a stable execution. For example, the system 200 may be capable of reaching a solution for any set of physical data or data conditions. In some cases, the system 200 can execute and find a solution in real time faster than a solution can be found in a quasi-real-time operation mode. In some cases, the system 200 can at all times, and in real time, maintain a good approximation for the temporal structure of the fracture planes.

In some example implementations, the event handler system 206 takes into consideration the error in the measurement of a point, and, in a more general fashion, its uncertainty. For example, the event handler system 206 may be configured to move an event from one cluster to another based on the event's uncertainty. The event handler system 206 may specify a minimum number of events inside a cluster. For example, the minimum number can be related to the minimum number of events that support a fracture plane. In some example implementations, a ratio between 0.5 and 2 can offer reasonably good results.

Figure 3A:
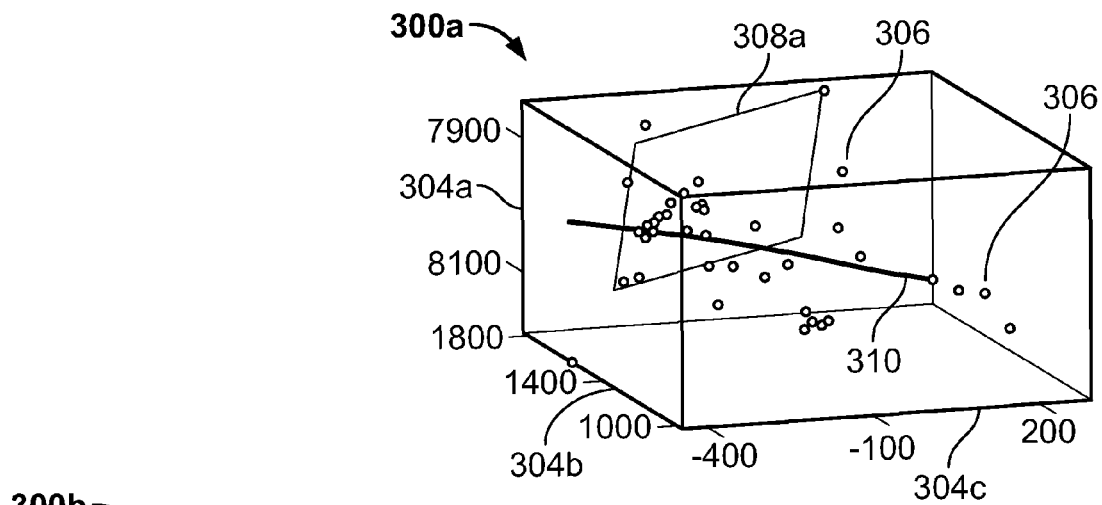
FIGS. 3A-3F are plots showing updates for an example fracture plane.
Figure 3B:
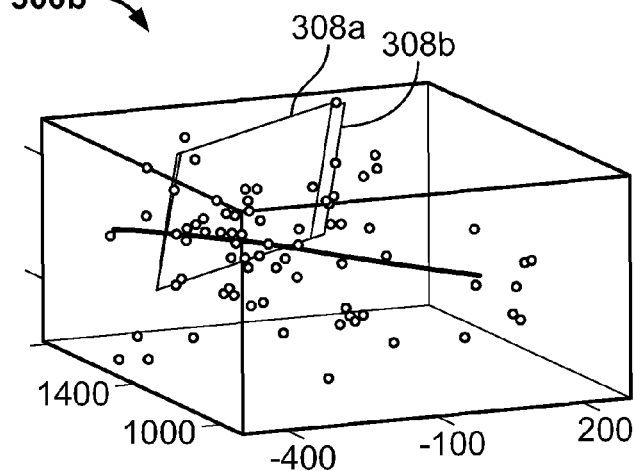
Figure 3C:
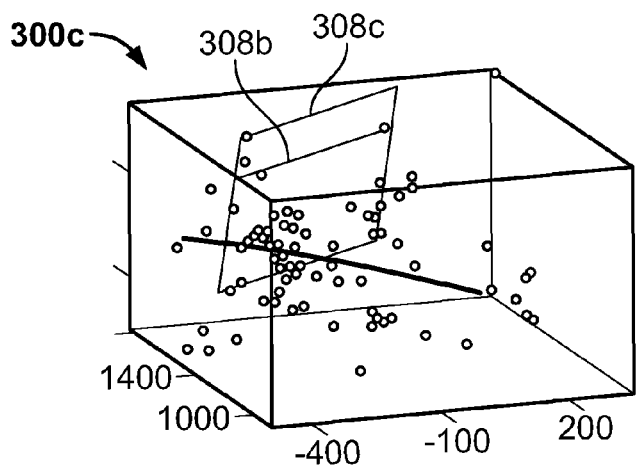
Figure 3D:
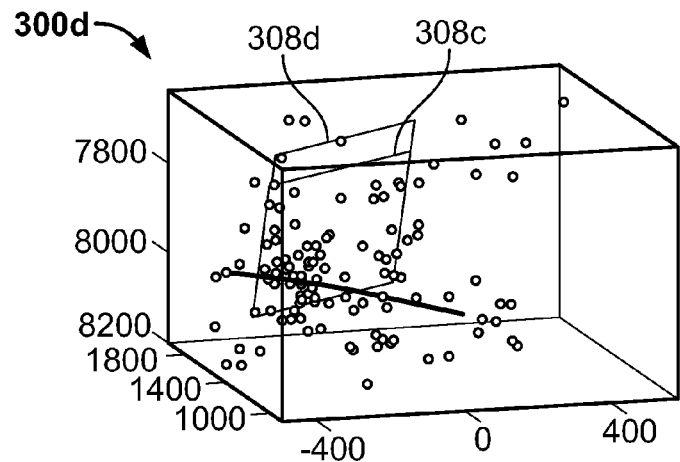
Figure 3E:
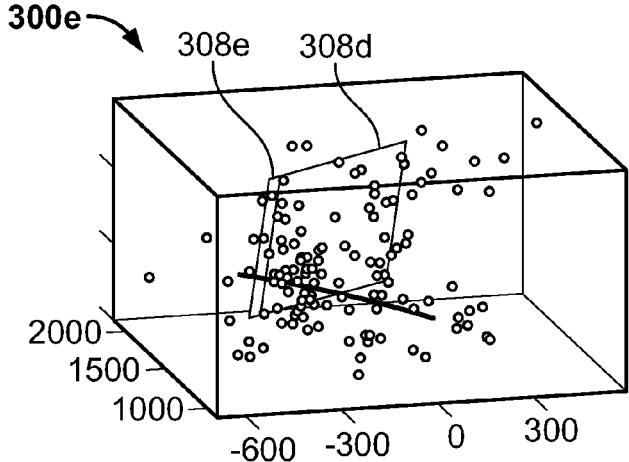
Figure 3F:
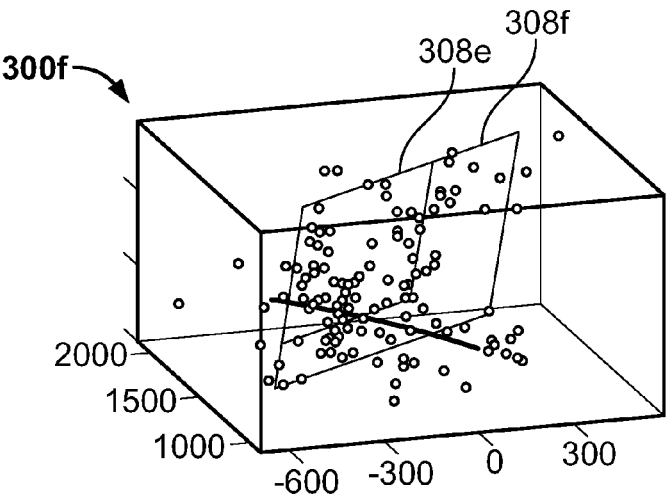

FIGS. 3A-3F are plots showing updates for an example fracture plane. The plots show an example time sequence for the fracture plane. FIG. 3A shows a plot 300a of an initial fracture plane 308a; each subsequent plot in the time sequence shows the fracture plane as updated based on a new microseismic data point. FIG. 3B shows a plot 300b of a first updated fracture plane 308b; FIG. 3C shows a plot 300c of a second updated fracture plane 308c; FIG. 3D shows a plot 300d of a third updated fracture plane 308d; FIG. 3E shows a plot 300e of a fourth updated fracture plane 308e; and FIG. 3F shows a plot 300f of a fifth updated fracture plane 308f. In each plot, the previous version of the fracture plane is shown for comparison. The plots in FIGS. 3A-3F also show the well bore 310 and microseismic events 306.

Each of the plots 300a, 300b, 300c, 300d, 300e, and 300f shows the respective fracture planes in a three-dimensional rectilinear coordinate system represented by the vertical axis 304a and two horizontal axes 304b and 304c. The vertical axis 304a represents a range of depths in a subterranean zone; the horizontal axis 304b represents a range of East-West coordinates; and the horizontal axis 304c represents a range of North-South coordinates (all in units of feet). As shown in the figures, the axes are scaled for each respective plot. In the examples shown in FIGS. 3A-3F, the fracture planes are represented by two-dimensional, rectangular areas extending in the three-dimensional coordinate system. Fracture planes can have other spatial geometries.

The initial fracture plane 308a and the updated fracture planes 308b, 308c, 308d, 308e, and 308f represent the growth and evolution of an individual fracture over time. In the example shown, the initial fracture plane 308a is identified when the $40^{th}$ microseismic event is received; the $87^{th}$ microseismic event triggers an update algorithm. For example, the process 430 shown in FIG. 4 (or another process) can be used to update a fracture plane based on a new microseismic event. FIG. 3B shows that updating the fracture plane based on the $87^{th}$ microseismic event changes the fracture plane's orientation. In particular, updating the initial fracture plane 308a based on the $87^{th}$ microseismic event causes the fracture plane to rotate to a new orientation, and the first updated fracture plane 308b has a different orientation than the initial fracture plane 308a. The remaining updates shown in FIGS. 3C-3F cause the fracture plane to propagate, and the plots show how the fracture plane's area increases as time progresses.

FIG. 3C shows an update based on the $89^{th}$ microseismic event received. Updating the first updated fracture plane 308b based on the $89^{th}$ microseismic event causes the fracture plane to grow vertically, and the second updated fracture plane 308c is taller than the first updated fracture plane 308b. FIG. 3D shows an update based on the $130^{th}$ microseismic event received. Updating the second updated fracture plane 308c based on the $130^{th}$ microseismic event causes the fracture plane to grow vertically, and the third updated fracture plane 308d is taller than the second updated fracture plane 308c. FIG. 3E shows an update based on the $152^{nd}$ microseismic event received. Updating the third updated fracture plane 308d based on the 152$^{nd}$ microseismic event causes the fracture plane to grow horizontally (toward the left in the figure), and the fourth updated fracture plane 308e is longer than the third updated fracture plane 308d. FIG. 3F shows an update based on the 157$^{th}$ microseismic event received. Updating the third updated fracture plane 308d based on the 157$^{th}$ microseismic event causes the fracture plane to grow horizontally (toward the right in the figure) and vertically, and the fifth updated fracture plane 308f is longer and taller than the fourth updated fracture plane 308e.

Figure 4:
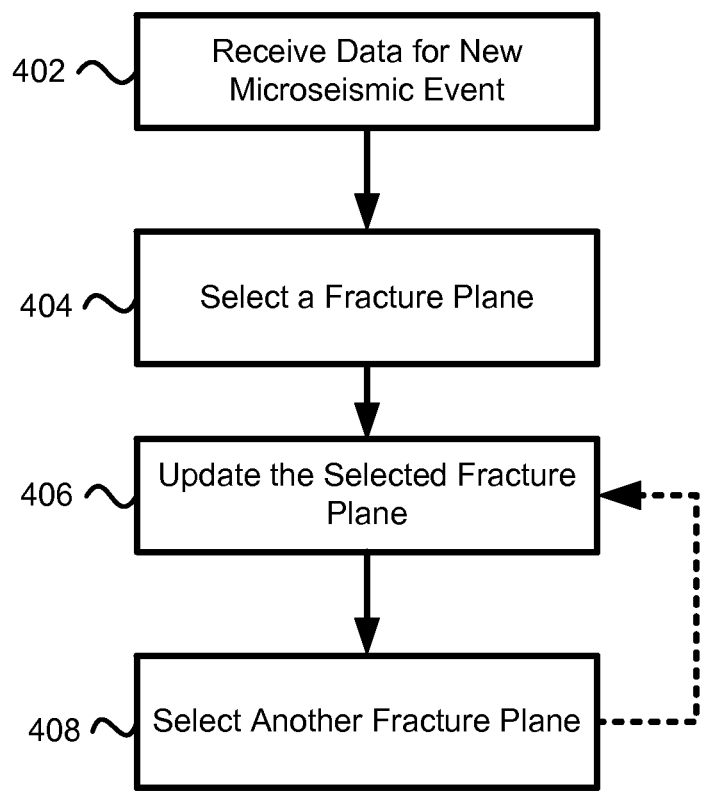
FIG. 4 is a flow chart of an example technique for updating fracture planes.

FIG. 4 is a flow chart of an example process 400 for updating fracture planes. Some or all of the operations in the process 400 can be implemented by one or more computing devices. In some implementations, the process 400 may include additional, fewer, or different operations performed in the same or a different order. Moreover, one or more of the individual operations or subsets of the operations in the process 400 can be performed in isolation or in other contexts. Output data generated by the process 400, including output generated by intermediate operations, can include stored, displayed, printed, transmitted, communicated or processed information.

In some implementations, some or all of the operations in the process 400 are executed in real time during a fracture treatment. An operation can be performed in real time, for example, by performing the operation in response to receiving data (e.g., from a sensor or monitoring system) without substantial delay. An operation can be performed in real time, for example, by performing the operation while monitoring for additional microseismic data from the fracture treatment. Some real time operations can receive an input and produce an output during a fracture treatment; in some instances, the output is made available to a user within a time frame that allows an operator to respond to the output, for example, by modifying the fracture treatment.

In some cases, some or all of the operations in the process 400 are executed dynamically during a fracture treatment. An operation can be executed dynamically, for example, by iteratively or repeatedly performing the operation based on additional inputs, for example, as the inputs are made available. In some instances, dynamic operations are performed in response to receiving data for a new microseismic event (or in response to receiving data for a certain number of new microseismic events, etc.).

At 402, microseismic data for a new microseismic event are received. For example, the microseismic data can be received from memory, from a remote device, or another source. The microseismic event data may include information on the measured locations of the new microseismic event, information on a measured magnitude of the new microseismic event, information on an uncertainty associated with the new microseismic event, information on a time associated with the new microseismic event, etc. The microseismic event data can be collected from an observation well, at a treatment well, at the surface, or at other locations in a well system. Microseismic data from a fracture treatment can include data for microseismic events detected before, during, or after the fracture treatment is applied. For example, in some instances, microseismic monitoring begins before the fracture treatment is applied, ends after the fracture treatment is applied, or both.

In some cases, the new microseismic event is obtained from a list of microseismic events. For example, the new microseismic event received at 402 can be selected from a list of "status changed" or "unassociated" microseismic events. The new microseismic event received at 402 can be a microseismic event that was detected at any time, and it may or may not be the most-recently detected microseismic event.

At 404, a fracture plane is selected. In some instances, the selected fracture plane is one of multiple previously-generated fracture planes. Here, a fracture plane can be considered "previously-generated," for example, when the fracture plane was generated before the data for the new microseismic event was received (e.g., at 402). In some implementations, parameters of a previously-generated fracture plane are the parameters that were identified from microseismic data collected before the new microseismic event was detected. The prior microseismic event data and the new microseismic event can be part of a microseismic data set from the same fracture treatment of a subterranean zone. In some instance, the prior microseismic event data and the new microseismic event are from different fracture treatments.

In some instances, when the data are received at 402, several fracture planes have already been generated. For example, tens or hundreds of fracture planes may have already been identified from previously-received microseismic data. As such, in some cases, the fracture plane is selected (at 404) from multiple previously-generated fracture planes. For example, the fracture plane can be selected from a list of previously-generated fracture planes based on an index, selection criteria, or other information.

Fracture planes (e.g., the previously-generated fracture plane selected at 402) and their parameters can be calculated from microseismic data by any suitable operation, process or algorithm. A fracture plane can be identified by computing the parameters of the fracture plane, for example, from the locations and other parameters of the measured microseismic events. In some cases, the fracture planes are identified in real time during the fracture treatment. Example techniques for identifying fracture planes from microseismic data are described U.S. Provisional Application No. 61/710,582, filed on Oct. 5, 2012.

At 406, the selected fracture plane is updated based on the new microseismic event. The first fracture plane can be updated by any suitable operation, process, or algorithm. In some cases, the first fracture plane is updated based on certain parameters (e.g., the orientation, area, distance residual, etc.) associated with the first fracture plane. Example techniques for updating fracture planes based on the new microseismic data are described in U.S. Provisional Application No. 61/710,582, filed on Oct. 5, 2012.

At 408, another, different fracture plane is selected. The fracture plane selected at 408 can be one of the other previously-generated fracture planes (i.e., other than the first fracture plane, selected at 404). The second fracture plan (selected at 408) can be selected based on information generated by updating the first fracture plane (at 406). For example, the second fracture plane can be selected based on its relationship to the updated fracture plane, or based on its relationship to microseismic data influencing the updated fracture plane. For example, the second fracture plane can be selected based on its relationship to an updated location, domain, size, or orientation of the first fracture plane, or the second fracture plane can be selected based on its relationship to microseismic event that were disassociated from or associated to the first fracture plane.

As shown in FIG. 4, the fracture plane selected at 408 can then be updated, for example, when the process 400 returns to 406. The process 400 can iterates the operations 406 and 408 one or more times. For example, iterating operations 406 and 408 can cause updates based on the new microseismic event to propagate to one, two, tens, or even hundreds of fracture planes. The updates can be propagated in a cascading fashion.

For example, the fracture planes can be updated in sequence or in parallel, with each update accounting for prior updates to other fracture planes.

In some examples, the cascading updates can be continued until a threshold is reached, until a new microseismic event is received, or until another terminating condition is reached. In some instances, the cascading updates terminate when the fracture planes reach a stable state, and further updates do not generate an improved solution. The updates may terminate, for example, when a confidence value reaches a certain value or increases by a certain amount. The updates may terminate, for example, when there are no unassociated microseismic events, when there are no status-changed microseismic events, or when all microseismic events are associated with a fracture plane.

In some cases, updating the second fracture plane (or any subsequent fracture plane) includes merging the first fracture plane and the second fracture plane. In some instances, the second fracture plane is selected (at 404) based on a determination that the first fracture plane and the second fracture plane should be merged because they represent the same physical fracture plane. For example, the second fracture plane may be selected based on a determination that the first fracture plane and the second fracture plane are separated by a distance that is less than a threshold distance, a determination that the first fracture plane and the second fracture plane intersect at an angle that is less than a threshold angle, or any other appropriate criteria.

In some instances, updating the first fracture plane (at 406) causes a microseismic event (other than the new microseismic event received at 402) to become disassociated from the first fracture plane. The second fracture plane can be selected (at 408) based on the second fracture plane's proximity to the disassociated microseismic event. The second fracture plane can then be updated, for example, by associating the second microseismic event with the second fracture plane and updating the second fracture plane based on the second microseismic event.

In some instances, the second fracture plane is selected (at 408) based on a microseismic event being disassociated from the second fracture plane. For example, updating the first fracture plane (at 406) may cause a microseismic event that was previously associated with the second fracture plane to become associated with the first fracture plane. The second fracture plane can then be updated, for example, based on the other remaining microseismic events that are associated with the second fracture plane.

In some implementations, the first fracture plane and the second fracture plane are updated to maximize a respective certainty index, or confidence level of each of the first fracture plane and the second fracture plane, or to maximize the certainty index, or the confidence level of the overall fracture plane systems. In some instances, the first fracture plane and the second fracture plane are updated to minimize the number of unassociated microseismic events. In some implementations, updating the fracture planes and propagating the fracture plane updates can be performed based in part on example algorithms described below, or based on any additional or different techniques.

In some implementations, a graphical representation of the updated fracture planes is generated. The graphical representation can be displayed, for example, to present the updated fracture plane in real time during the fracture treatment. The graphical representation can include a single fracture plane or multiple fracture planes. The graphical representation can include a three-dimensional representation of the fracture plane, a three-dimensional representation of the microseismic events associated with the fracture plane, or a combination of these and other features. Examples of a graphical representation of a fracture plane are shown in FIGS. 3A, 3B, 3C, 3D, 3E, and 3F. Other types of graphical representations can be used.

The graphical representation can be displayed on a monitor, screen, or other type of display device. In some instances, the display is updated. For example, the displayed graphical representation can be updated based on additional microseismic event data from the fracture treatment. Displaying (and in some cases, updating) the graphical representation can allow a user to view dynamic behavior associated with a fracture treatment. In some cases, a fracture plane can be updated as additional microseismic data is accumulated, and the updates may cause the fracture plane to grow or change orientation.

The fracture planes can be derived from or be supported by a set of microseismic data for microseismic events. The microseismic event data may include information on the measured locations of the microseismic events, information on a measured magnitude of the microseismic events, information on an uncertainty associated with the microseismic events, information on a time associated with the microseismic events, etc. A point can refer to a data item or a data event within a set of microseismic data. In some instances, the set of microseismic data can include N data points in the three-dimensional space. A three dimensional error may be associated with each of these points. For a given overall uncertainty index, an example algorithm can be processed to find the locations and orientations of fracture planes associated with this data set, where each with a certainty index that is larger or equal to a minimal certainty index. At the end of (or at any point during) the process, each of the points may be associated with one plane, or several planes, or may not be associated with any plane. The points that are not associated with any plane belong to the unassociated bucket, which might be interpreted as outliers.

In some implementations, the algorithm can assign a certainty index array to every data point and to every fracture plane. For instance, denoting p as the current number of planes found, the certainty index array can contain a sequence of p scalar numbers $s_i$, $1 \le i \le p$, indicating the certainty or the probability that it is associated with the plane i. The certainty that a computed plane is correct can be related to the relevant certainty of all of its associated points. For example, if S is the set of all points that are associated with a given plane and d is the distance of the mean value of the point from the plane, the algorithm can assume that the sum of the values of d to the power r is minimal. In some aspects of implementations, r can be 1 or 2, or any other appropriate value. This sum is one of the aspects or contributions to the certainty of the plane. In some instances, the algorithm can be executed to maximize the sum of each plane's certainty to the power of r.

In some implementations, the fracture plane orientation can include two angles that define the plane's general direction in the three-dimensional space, and they can be referred to as the plane's orientation components. The fracture plane's parameters can include the plane's orientation and position, or any other appropriate parameters. For instance, a triplet, a set of three points in the three-dimensional environment, can be used to represent the fracture plane's parameters. A data set can contain the set of three dimensional points, based on which a fracture plane model can be solved. A point can have a status of "Associated" or "Unassociated," depending on whether this point is associated or unassociated with a plane. The "support" of a plane can include the set of points that are associated with the plane.

In some implementations, some threshold parameters can be defined. The threshold parameters can include, for example, the minimal certainty for a point to belong to a plane, the minimal certainty that a set of points define a plane, the minimal certainty that the overall plane's orientations and positions are optimal, or the minimal value of σ below which the principal orientations of the natural histogram are chosen. Additional or different threshold parameters can be used.

In some implementations, some fixed numerical parameters of the example algorithm can be specified. The fixed numerical parameters can include, for example, the minimal number of points in the unassociated bucket that will be considered to change the plane's parameters, the norm r via which the optimization is performed (for example, r can be 1 or 2), the minimal support that is the minimum number of points that may support a plane. Additional or different fixed numerical parameters can be considered. As a specific example, the minimum plane support can be five points; r can be 2; the distance threshold can be set as 3σ; and the minimum angle can be set as 8 degrees. Other values can be used for these and other parameters. Additional or different parameters and their respective values can be specified.

In some implementations, the algorithms can include several steps. A step can include a sequence of several phases. The step or phase can be performed in an iterative manner. An example algorithm may include one or more of the following steps and phases. In some scenarios, some steps and phases can be performed in the same or a different order. In some implementations, additional, fewer, or different steps and phases may be performed. In some instances, one or more of the individual steps, phases, or subsets of the steps and phases can be performed in isolation, in iteration, or in other contexts.

At an initial step ("Step 0") of an algorithm, computational data for the algorithm are prepared. For example, in Phase 1 of Step 0, the first estimate for the primary orientations can be obtained. As a specific example, the algorithm can start by implementing a natural histogram for all the triplets in the data set and using the enhanced Hough transform for the two orientation's components. The algorithm can choose the hypercube with σ smaller than the given threshold, which may indicate, for example, that these two-dimensional histogram hypercube points are on the most relevant and major or principal planes' orientations. Denoting q as the number of selected primary orientations, these q different primary orientations can be sorted with respect to their σ and for each of them the algorithm can calculate all the different orientations based on the points in the specific hypercube.

In Phase 2 of Step 0, for each of the chosen q planes, some or all of the following operations can be performed: for each of these planes' hypercube, construct all the triplets supporting the orientation residing in the same hypercube, and calculate these planes positions. These planes are sorted with respect to their distances from the origin. There are $C_i$ triplets planes for the primary orientation i. These planes can serve as initial conditions for the process defined in Step 1. The next phase can start with the highly confident orientation (e.g., the one with the minimal σ).

In Phase 3 of Step 0, some fixed numerical values are specified, for example, the norm or the power r, the maximum number of iterations, a minimum distance between planes, minimum angles between planes, minimum number of associated points in a plane, maximum planes shared by one point, or any other appropriate parameter.

For one or more subsequent steps (denoted "Step i," where $1 \leq i \leq q$), at step the algorithm can seek to fix a plane in the spatial three-dimensional space which is more or less in the primary orientation that was calculated at Step 0. An initial guess for its location can be used. Then the algorithm can iterate to better identify and to enhance the plane's position in this space.

In some implementations, for each of the q primary orientations, the following process can be performed. In Phase 0 of "Step i," set j=0. In Phase 1 of "Step i," set j=j+1 and use the $j^{th}$ plane in $C_i$ as an initial condition for the following process. In Phase 2 of "Step i," position the $i^{th}$ plane using its $j^{th}$ initial condition. As an example, using the highest confident orientation in the results of Phase 1 and using all the data points, a plane with this orientation can be optimally or near optimally positioned for a given value of r. In some implementations, the positioning computation can be accomplished in linear CPU time with respect to the size of the points in the data set. In some aspects of implementation, each point can be assigned with a certainty or confidence value in its certainty index array, which can be, for example, inversely proportional to 1 plus the distance from the plane plus its location error. The status of the points with a certainty index smaller than the minimum threshold can be changed to "Unassociated", and the plane can be re-positioned based on the set of associated points. This phase can be repeated until a final position is achieved. It may take, for example, two or three or more iterations to achieve this state. After the first iteration, the algorithm can allow the plane's orientation components to be properly optimized or otherwise improved, and the changes in the orientation can be minimal (or in some cases, the changes can be substantial).

In Phase 3 of "Step i," the final support for the plane can be determined. Each of the unassociated points can be checked again against the final position of the plane to verify that it is indeed unassociated. If there is a chance for its status to be "Associated", the unassociated point can be put into a "needed to be processed" temporary bucket. In some cases, it can be proven that the plane's position will not be changed much due to the accumulated points in the "needed to be processed" bucket. Nevertheless, if the number of points is larger than the threshold number, the position of this plane can be re-shaped, and appropriate changes to the certainty index arrays can be performed.

In Phase 4 of "Step i," an approval the plane can be determined. If the resultant plane does not have the minimal support, it can be deleted. In Phase 5 of "Step i," the algorithm can go back to Phase 2. Using the next initial condition it can seek a new position for this orientation. The algorithm can continue until all initial conditions are used.

In some implementations, the planes belong to the current primary orientation are sorted. Planes that are close to each other can be merged. In some instances, if a merge will result in "No Plane," then the original planes are left as separate fracture planes. After all merges are appropriately conducted, another re-association process for the unassociated points can be performed. The algorithm can go to Phase 0 of the next primary direction (i.e., of "Step i+1").

In a next step, the angle between any two planes can be checked. If the angle is smaller than the threshold, the planes can be merged. If the merge result in "No Planes," then leave the original planes. After all merges are appropriately conducted, another re-association process for the unassociated points can be performed.

In a next step, the number of associations of each point can be checked. If the number is larger than the threshold, the point can be marked as an option to be changed to an unassociated status. For each of the planes, the algorithm can start to delete the unassociated points based on their sorted small to large confidence level, for example, as long as the planes continue to be valid. In a next step, the algorithm can try to associate all unassociated points that did not exceed the maximum association.

Implementations may include one or more of the following features. A plane can be defined by its ID, orientation components, position and the points that are associated with it, or any other appropriate identification. In some implementations, the point may also have a vector of the planes' ID with which it is associated, along with its distance from each of them. The "Merge" operator can find two planes and merge them, for example, by finding a new plane (as per definition of 1 above), based on all the supporting points of the two original planes. In some instances, some points may become "Unassociated." If the resultant plane is not well supported, this operation may result in "No Plane," and the two original planes will stay in effect.

In some implementations, the algorithm can include 3 levels of iterations. The outer loop traverses all the identified primary orientations. For each of the identified primary orientations, the algorithm includes a middle loop, a merge operation of small angle planes, and a re-association loop for the unassociated points. The middle loop traverses all the initial conditions of the respective primary orientation and can further include an inner loop and a merge procedure of close planes. The inner loop iterates through all relevant points until a convergence is achieved for each initial condition. In some instances, if the initial condition plane is close to the one of the existing planes, the algorithm may proceed directly into the merge procedure.

In some instances, the algorithm can help maximize (or otherwise improve) the confidence level of each of the planes; maximize (or otherwise improve) the confidence level of the overall planes system; minimize (or otherwise improve) the number of the unassociated events; or achieve a combination of these and other objectives. In some cases, the algorithm may offer more than one solution. The offered solutions can be very close to each other in terms of certain parameters.

In some implementations, an event data point may support more than one fracture plane. There may be some physics or operational reasons that one may want to limit the number of planes shared by any microseismic events. This can be implemented using a technique referred as "sharing-p." For example, sharing-2 means that the events may support 2 different planes at most. Sharing-4 means that the events can share 4 planes at most. Sharing-1 means that an event may support just 1 plane at most and sharing-infinity means that there is no limitation of sharing. In some instances, operators and users can use sharing-2. In some cases, users can carry two parallel presentations: one—the three confidence levels window for sharing-1, and three confidence level windows of sharing-2. In some implementations, an algorithm based on the microseismic event's features, and the current fracture's planes structure or configuration, may be able to attach to it the appropriate "share" parameter.

In some instances, the sharing-p concept can reduce the complexity of the fracture matching algorithm to a scene that is more manageable and better understandable by the users. In some cases, an algorithm can include "sharing-2" as the default setting and the parameter "p" in the "sharing-p" can be changed inside a given field of microseismic events.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A client and server are generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). The relationship of client and server arises by virtue of computer programs running on the respective computers and having a client-server relationship to each other.

In some aspects of what is described here, dominant orientations embedded in sets of fractures associated with microseismic events can be dynamically identified during a fracture treatment. For example, fracture planes can be extracted from real time microseismic events collected from the field. The fracture planes can be identified based on microseismic event information including: event locations, event location measurement uncertainties, event moment magnitudes, event occurrence times, and others. At each point in time, data can be associated with previously-computed basic planes, including the microseismic supporting set of events.

In some aspects of what is described here, a probability histogram or distribution of basic planes can be constructed from the microseismic events collected, and the histogram or distribution can be used for deriving the dominant fracture orientations. Fractures extracted along the dominant orientations can, in some instances, provide an optimal match to the real time microseismic events. The histogram or distribution and the dominant orientations can have non-negligible sensitivity to the new incoming microseismic event. As such, some planes identified during the time microseismic data are assimilated may not be accurate when comparing to the post microseismic event data results. Example techniques for generating, updating, and using histograms based on microseismic data are described in U.S. Provisional Application No. 61/710,582, filed on Oct. 5, 2012.

In some aspects of what is described here, an accuracy confidence parameter can provide a measure for the accuracy of real-time identified planes. Factors impacting a plane's accuracy confidence can include an event's intrinsic properties, the relationship between support events and the plane, and the weight reflecting the fracture orientation trends of post microseismic event data. In some instances, fracture planes with high confidence at the end of hydraulic fracturing treatment that were identified in real time fashion are consistent with those obtained from the post event data.

In some aspects, some or all of the features described here can be combined or implemented separately in one or more software programs for real-time automated fracture mapping. The software can be implemented as a computer program product, an installed application, a client-server application, an Internet application, or any other suitable type of software. In some cases, a real-time automated fracture mapping program can dynamically show users spatial and temporal evolution of identified fracture planes in real-time as microseismic events gradually accumulate. The dynamics may include, for example, the generation of new fractures, the propagation and growth of existing fractures, or other dynamics. In some cases, a real-time automated fracture mapping program can provide users the ability to view the real-time identified fracture planes in multiple confidence levels. In some instances, users may observe spatial and temporal evolution of the high confidence level fractures, which may exhibit the dominant trends of overall microseismic event data. In some cases, a real-time automated fracture mapping program can evaluate fracture accuracy confidence, for example, to measure the certainty of identified fracture planes. The accuracy confidence values may, for example, help users better understand and analyze changes in a probability histogram or orientation distribution, which may continuously vary with the real-time accumulation of microseismic events. In some cases, a real-time automated fracture mapping program can provide results that are consistent with post data fracture mapping. For example, at the end of the hydraulic fracture treatment, the results produced by the real-time automated fracture mapping program can be statistically consistent with those obtained by a post data automated fracture mapping program operating on the same data. Such features may allow field engineers, operators and analysts, to dynamically visualize and monitor spatial and temporal evolution of hydraulic fractures, to analyze the fracture complexity and reservoir geometry, to evaluate the effectiveness of hydraulic fracturing treatment and to improve the well performance.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

The invention claimed is:

1. A computer-implemented method for analyzing microseismic data from a fracture treatment, the method comprising:
  in response to a microseismic event being detected and added to a microseismic data set, updating, by data processing apparatus, a first fracture plane based on the microseismic event in the microseismic data set associated with a fracture treatment of a subterranean zone, the first fracture plane being one of a plurality of previously-generated fracture planes;
  updating a second, different fracture plane of the plurality of previously-generated fracture planes to account for a parameter that is modified by updating the first fracture plane based on the microseismic event, wherein the parameter comprises at least one of:
an updated orientation of the first fracture plane;
an updated size of the first fracture plane;
an updated list of unassociated microseismic events; or
an updated list of microseismic events associated with the first or second fracture plane;
cascading updates until a terminating condition is reached, each update accounting for prior updates to other fracture planes; and
generating a model of the subterranean zone based on the updated first fracture plane and the updated second fracture plane.

2. The method of claim 1, wherein updating the second fracture plane includes merging the first fracture plane and the second fracture plane.

3. The method of claim 2, comprising merging the first fracture plane and the second fracture plane in response to determining that the first fracture plane and the second fracture plane are separated by a distance that is less than a threshold distance.

4. The method of claim 2, comprising merging the first fracture plane and the second fracture plane in response to determining that the first fracture plane and the second fracture plane intersect at an angle that is less than a threshold angle.

5. The method of claim 1, wherein the microseismic event comprises a first microseismic event, updating the first fracture plane causes a second, different microseismic event to become disassociated from the first fracture plane, and updating the second fracture plane comprises:
associating the second microseismic event with the second fracture plane; and
updating the second fracture plane based on the second microseismic event.

6. The method of claim 1, wherein the microseismic event comprises a first microseismic event, updating the first fracture plane causes a second, different microseismic event to become associated with the first fracture plane and disassociated from the second fracture plane, and updating the second fracture plane comprises updating the second fracture plane based on the second microseismic event becoming disassociated from the second fracture plane.

7. A non-transitory computer-readable medium encoded with instructions that, when executed by data processing apparatus, perform operations comprising:
in response to a microseismic event being detected and added to a microseismic data set, updating a first fracture plane based on the microseismic event in the microseismic data set associated with a fracture treatment of a subterranean zone, the first fracture plane being one of a plurality of previously-generated fracture planes;
updating a second, different fracture plane of the plurality of previously-generated fracture planes to account for a parameter that is modified by updating the first fracture plane based on the microseismic event, wherein the parameter comprises at least one of:
an updated orientation of the first fracture plane;
an updated size of the first fracture plane;
an updated list of unassociated microseismic events; or
an updated list of microseismic events associated with the first or second fracture plane;
cascading updates until a terminating condition is reached, each update accounting for prior updates to other fracture planes; and
generating a model of the subterranean zone based on the updated first fracture plane and the updated second fracture plane.

8. The computer-readable medium of claim 7, wherein updating the second fracture plane includes merging the first fracture plane and the second fracture plane.

9. The computer-readable medium of claim 8, wherein the operations comprise merging the first fracture plane and the second fracture plane in response to determining that the first fracture plane and the second fracture plane are separated by a distance that is less than a threshold distance.

10. The computer-readable medium of claim 8, wherein the operations comprise merging the first fracture plane and the second fracture plane in response to determining that the first fracture plane and the second fracture plane intersect at an angle that is less than a threshold angle.

11. The computer-readable medium of claim 7, wherein the microseismic event comprises a first microseismic event, updating the first fracture plane causes a second, different microseismic event to become disassociated from the first fracture plane, and updating the second fracture plane comprises:
associating the second microseismic event with the second fracture plane; and
updating the second fracture plane based on the second microseismic event.

12. The computer-readable medium of claim 7, wherein the microseismic event comprises a first microseismic event, updating the first fracture plane causes a second, different microseismic event to become associated with the first fracture plane and disassociated from the second fracture plane, and updating the second fracture plane comprises updating the second fracture plane based on the second microseismic event becoming disassociated from the second fracture plane.

13. A system comprising:
a computer-readable medium that stores microseismic event data associated with a fracture treatment of a subterranean zone; and
data processing apparatus operable to:
in response to a microseismic event being detected and added to a microseismic data set, update a first fracture plane based on the microseismic event in the microseismic data set associated with a fracture treatment of a subterranean zone, the first fracture plane being one of a plurality of previously-generated fracture planes;
update a second, different fracture plane of the plurality of previously-generated fracture planes to account for a parameter that is modified by updating the first fracture plane based on the microseismic event, wherein the parameter comprises at least one of:
an updated orientation of the first fracture plane;
an updated size of the first fracture plane;
an updated list of unassociated microseismic events; or
an updated list of microseismic events associated with the first or second fracture plane;
cascade updates until a terminating condition is reached, each update accounting for prior updates to other fracture planes; and
generate a model of the subterranean zone based on the updated first fracture plane and the updated second fracture plane.

14. The system of claim 13, wherein updating the second fracture plane includes merging the first fracture plane and the second fracture plane.

15. The system of claim 14, the data processing apparatus being operable to merge the first fracture plane and the second fracture plane in response to determining that the first fracture plane and the second fracture plane are separated by a distance that is less than a threshold distance.

16. The system of claim 14, the data processing apparatus being operable to merge the first fracture plane and the second fracture plane in response to determining that the first fracture plane and the second fracture plane intersect at an angle that is less than a threshold angle.

17. The system of claim 13, wherein the microseismic event comprises a first microseismic event, updating the first fracture plane causes a second, different microseismic event to become disassociated from the first fracture plane, and updating the second fracture plane comprises:

associating the second microseismic event with the second fracture plane; and updating the second fracture plane based on the second microseismic event.

18. The system of claim 13, wherein the microseismic event comprises a first microseismic event, updating the first fracture plane causes a second, different microseismic event to become associated with the first fracture plane and disassociated from the second fracture plane, and updating the second fracture plane comprises updating the second fracture plane based on the second microseismic event becoming disassociated from the second fracture plane.

* * * * *